US011338692B2

(12) United States Patent
Press et al.

(10) Patent No.: US 11,338,692 B2
(45) Date of Patent: May 24, 2022

(54) ELECTRIC VEHICLE CHARGING OPTIMIZATION

(71) Applicants: Matthew David Press, Culver City, CA (US); Joel Seth Browning, Saugus, CA (US)

(72) Inventors: Matthew David Press, Culver City, CA (US); Joel Seth Browning, Saugus, CA (US)

( * ) Notice: Subject to any disclaimer, the term of this patent is extended or adjusted under 35 U.S.C. 154(b) by 515 days.

(21) Appl. No.: 16/455,596

(22) Filed: Jun. 27, 2019

(65) Prior Publication Data
US 2020/0338999 A1 Oct. 29, 2020

Related U.S. Application Data

(60) Provisional application No. 62/840,219, filed on Apr. 29, 2019.

(51) Int. Cl.
  *B60L 53/30* (2019.01)
  *B60L 58/13* (2019.01)
  (Continued)

(52) U.S. Cl.
  CPC ............ *B60L 53/305* (2019.02); *B60L 58/13* (2019.02); *H04W 4/027* (2013.01); *H04W 4/38* (2018.02); *H04W 4/44* (2018.02); *B60L 2240/622* (2013.01)

(58) Field of Classification Search
  CPC .. B60L 53/305; B60L 58/13; B60L 2240/622; H04W 4/38; H04W 4/44; H04W 4/027
  (Continued)

(56) References Cited

U.S. PATENT DOCUMENTS

2010/0301810 A1* 12/2010 Biondo ................ H04Q 9/00
                                                                 320/155
2012/0309455 A1    12/2012 Klose
                             (Continued)

FOREIGN PATENT DOCUMENTS

GB          2561409         10/2018
WO    WO-2011156776 A2 *  12/2011  ............. B60L 55/00
WO    WO-2020150155 A1 *   7/2020  ............. B60L 53/57

OTHER PUBLICATIONS

Optimizing Energy Consumption With Evse Charging Schedule, Insideevs Editorial Team; Jan. 30, 2019; retrieved from https://insideevs.com/news/342303/optimizing-energy-consumption-with-evse-charging-schedule/.

*Primary Examiner* — Suresh Memula
(74) *Attorney, Agent, or Firm* — Lempia Summerfield Katz LLC

(57) ABSTRACT

A system for determining a state-of-charge (SOC) of an electric vehicle includes a housing that is supportable within the electric vehicle, one or more sensors supported by the housing, and a processor. The one or more sensors are configured to determine one or more values related to the electric vehicle, respectively. Each value of the one or more values represents a state of the electric vehicle or a state of an environment in which the electric vehicle is located. The processor is configured to estimate an SOC of the electric vehicle based on the one or more determined values related to the electric vehicle. The device also includes a wireless communication interface configured to transmit data representative of the estimated SOC of the electric vehicle and/or data representative of the one or more values related to the electric vehicle to the processor or to another processor.

21 Claims, 8 Drawing Sheets

(51) Int. Cl.
*H04W 4/02* (2018.01)
*H04W 4/38* (2018.01)
*H04W 4/44* (2018.01)

(58) Field of Classification Search
USPC .......................................................... 320/109
See application file for complete search history.

(56) References Cited

U.S. PATENT DOCUMENTS

| | | |
|---|---|---|
| 2013/0020992 A1 | 1/2013 | Wu |
| 2013/0179061 A1 | 7/2013 | Gadh |
| 2014/0015487 A1 | 1/2014 | Brown |
| 2015/0175026 A1 | 6/2015 | Uyeki |
| 2015/0224891 A1* | 8/2015 | Petrosian .............. G07C 5/008 701/31.4 |
| 2015/0298567 A1 | 10/2015 | Uyeki |
| 2016/0144728 A1 | 5/2016 | Harper |
| 2017/0120761 A1 | 5/2017 | Kapadia |
| 2017/0176195 A1 | 6/2017 | Rajagopalan |
| 2018/0086223 A1* | 3/2018 | Lindemann ........ G01C 21/3469 |
| 2019/0092177 A1 | 3/2019 | Malik |
| 2019/0165580 A1* | 5/2019 | Doherty .................. H02J 3/32 |
| 2020/0070679 A1* | 3/2020 | Wang ..................... B60L 58/12 |
| 2020/0139845 A1* | 5/2020 | Henrichs ................ H04L 12/40 |
| 2020/0333151 A1* | 10/2020 | Akhtar ............... G01C 21/3469 |
| 2021/0206289 A1* | 7/2021 | Otaka ............... H04W 52/0258 |

* cited by examiner

ELECTRIC VEHICLE CHARGING OPTIMIZATION

PRIORITY

This application claims the benefit of U.S. Provisional Application No. 62/840,219, filed Apr. 29, 2019, which is hereby incorporated by reference in its entirety.

BACKGROUND

The California electric vehicle market alone is expected to grow from a current 500,000 vehicles to more than 5,000,000 vehicles in the next decade. The United States as a whole may face similar electric vehicle market increases. Each of the electric vehicles creates, on average, 1.5 times as much demand as a typical central air conditioning system, assuming 7 kW chargers.

Left unchecked, this increase in demand will likely occur during current peak demand hours. With this projected rapid growth of electrical demand, generation assets, and transmission and distribution systems will need substantial and costly upgrades, which will result in increased rates for all ratepayers, including non-electric vehicle owning customers. Also, wholesale electricity costs will increase as demand during peak hours increases.

SUMMARY AND DESCRIPTION

The scope of the present invention is defined solely by the appended claims and is not affected to any degree by the statements within this summary.

In order to maximize the efficiency of current infrastructure and thus minimize rate increases to ratepayers, a system for optimizing charging of electric vehicles includes a server in communication with charge calculators located within the electric vehicles, respectively, and connected chargers corresponding to the electric vehicles, respectively. Each of the charge calculators includes sensors and may estimate state-of-charge (SOC) for the respective electric vehicle based on data generated by the sensors and publicly available information about the make and model of the respective electric vehicle. Each of the charge calculators sends a representation of the estimated SOC and/or data from the sensors to the server, and the server generates charging schedules for the respective electric vehicles based on the representation of the estimated SOC and/or the data from the sensors. The sever generates the charging schedules for the respective electric vehicles by optimizing an overall charging schedule for the electric vehicles with a goal of smoothing an electricity demand curve and thus, reducing cost for all ratepayers connected to a particular electricity grid. The server sends the generated charging schedules to the chargers, respectively, and the chargers allow and stop charging of the electric vehicles based on the generated charging schedules, respectively.

In a first aspect, a system for determining a state-of-charge (SOC) of an electric vehicle includes a housing that is separate from but supportable within the electric vehicle, one or more sensors supported by the housing, a processor in communication with the one or more sensors, and a wireless communication interface supported by the housing and in communication with the processor. The one or more sensors are configured to determine one or more values related to the electric vehicle, respectively. Each value of the one or more values represents a state of the electric vehicle or a state of an environment in which the electric vehicle is located. The processor is configured to estimate an SOC of the electric vehicle based on the one or more determined values related to the electric vehicle. The wireless communication interface is configured to transmit data representative of the estimated SOC of the electric vehicle, data representative of the one or more values related to the electric vehicle, or the data representative of the estimated SOC of the electric vehicle and the data representative of the one or more values related to the electric vehicle to the processor or to another processor. The other processor is remote from the electric vehicle.

In a second aspect, a method of determining an SOC of an electric vehicle includes determining, by a sensor of a device separate from but supported within the electric vehicle, a state of the electric vehicle or a state of an environment in which the electric vehicle is located. A first processor estimates an SOC of the electric vehicle based on the determined state of the electric vehicle or the determined state of the environment. The first processor is in communication with the sensor. A wireless communication interface of the device sends data representative of the determined state of the electric vehicle or the state of the environment in which the electric vehicle is located, data representative of the estimated SOC, or the data representative of the determined state of the electric vehicle or the state of the environment in which the electric vehicle is located and the data representative of the estimated SOC to the first processor or a second processor. The second processor is remote from the electric vehicle.

In a third aspect, a device for optimizing charging of a plurality of electric vehicles includes a processor in communication with a plurality of charge calculators located in the plurality of electric vehicles, respectively, and in communication with one or more charger adapters associated with one or more electric vehicles of the plurality of electric vehicles, respectively, at least one charger connectable to at least one electric vehicle of the plurality of electric vehicles, or a combination thereof. The device also includes a wireless communication interface in communication with the plurality of charge calculators via a network. The wireless communication interface is configured to receive data from the plurality of charge calculators representing SOC for the plurality of electric vehicles, respectively, data representing energy requirements for the plurality of electric vehicles, respectively, data from sensors of the plurality of charge calculators, respectively, or any combination thereof. The device includes a memory in communication with the processor. The memory is configured to store the data representing SOC for the plurality of electric vehicles, respectively, the data representing energy requirements for the plurality of electric vehicles, respectively, the data from the sensors of the plurality of charge calculators, respectively, or any combination thereof. The processor is configured to identify power supply information. The processor is also configured to determine charging schedules for the plurality of electric vehicles, respectively, based on the data representing SOC, the data representing energy requirements, the sensor data, or any combination thereof, and the identified power supply information. The determination of the charging schedules includes optimization of when to charge each electric vehicle of the plurality of electric vehicles, such that a cost for charging the plurality of electric vehicles is minimized. The wireless communication interface is configured to send the determined charging schedules to the one or more charger adapters, the at least one charger, or the combination thereof, respectively.

BRIEF DESCRIPTION OF THE DRAWINGS

For a more complete understanding of the disclosure, reference is made to the following detailed description and accompanying drawing figures, in which like reference numerals may be used to identify like elements in the figures.

Figure 1:
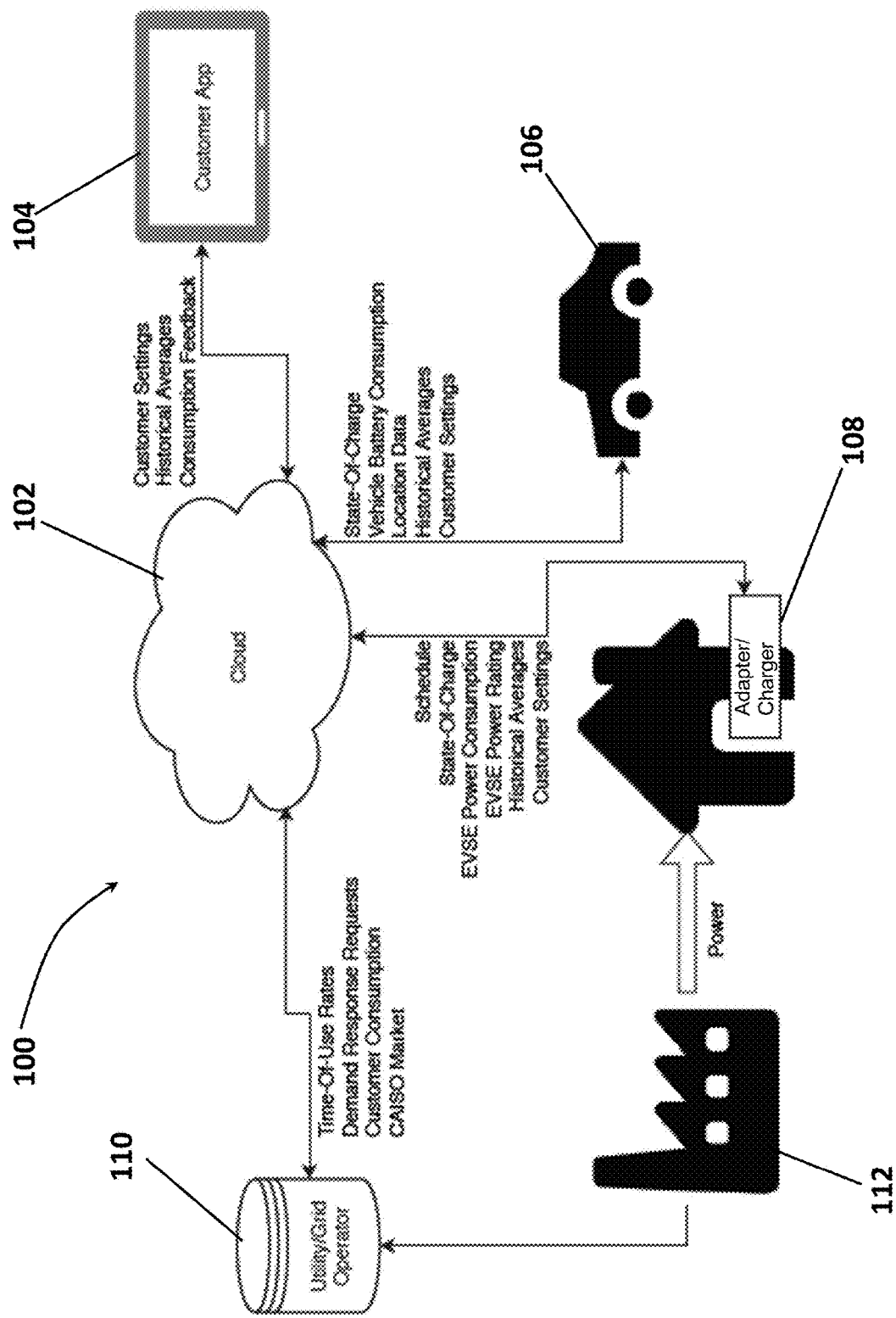
FIG. 1 shows one embodiment of an electric vehicle charging optimization system.

While the disclosed devices, systems, and methods are representative of embodiments in various forms, specific embodiments are illustrated in the drawings (and are hereafter described), with the understanding that the disclosure is intended to be illustrative, and is not intended to limit the claim scope to the specific embodiments described and illustrated herein.

DETAILED DESCRIPTION

An electric vehicle charging optimization system is able to collect state-of-charge (SOC) data from electric vehicles, respectively, which allows an optimized overall charging schedule for the electric vehicles to be created. Charging the electric vehicles according to the optimized overall charging schedule smooths an energy demand curve for a particular grouping of ratepayers (e.g., for a grid to which the electric vehicles are connected, a system, a particular geographical location, a particular electrical line, a particular capacity, a building, a particular substation, a particular feeder, and/or a distribution network) and provides that the electric vehicles are charged according to user needs at a lower cost.

The electric vehicle charging optimization system includes a server (e.g., the Cloud) and for each electric vehicle for which charging is to be optimized, two pieces of hardware. The two pieces of hardware include a charger with an adapter or a connected charger that charges the respective electric vehicle, and a charge calculator. The adapter and the charge calculator are plug-and-play and do not require professional installation.

The adapter or a connected charger controls charging. For example, the adapter or the connected charger controls when charging begins and stops, controls how the charger charges (e.g., amperage), and/or measures energy consumption. The adapter is a coupler that interfaces with the electric vehicle and the charger (e.g., electric vehicle supply equipment (EVSE)) used to charge the electric vehicle. The adapter is connected on one side to the EVSE and is connected on the other side to the electric vehicle. The adapter is thus able to communicate with both the EVSE and the electric vehicle via, for example, pilot and ground connections. This allows the adapter to not only be plug-and-play with a number of EVSEs, but also, the adapter minimally impacts normal use and operation of charging the electric vehicle.

The charge calculator is separate from but positioned within the electric vehicle (e.g., rides along in the center console of the electric vehicle). In one example, the charge calculator is able to accurately estimate an amount of energy consumed by the electric vehicle. The charge calculator is a device that houses a suite of sensors that collect data on vehicle conditions in real time. Using this data and information about the make and model of the electric vehicle, a processor of the charge calculator in communication with the suite of sensors calculates the amount of energy used by the electric vehicle as the electric vehicle is driven. Additionally or alternatively, the charge calculator may transmit the collected data on the vehicle conditions to a cloud. In one example, the cloud calculates the amount of energy used by the electric vehicle as the electric vehicle is driven based on the collected data that is transmitted, and received by the cloud.

The charge calculator may be integrated into any electric vehicle without wiring or installation other than connecting the charge calculator to a power source (e.g., a cigarette lighter or a USB interface) within the electric vehicle, and setting up the charge calculator with, for example, a website and/or an application on a mobile device. In one example, the charge calculator is a mobile device such as a smart phone that includes the suite of sensors.

Using the data from the charge calculator, the server may determine in real time how much energy is needed when charging is set to begin (e.g., at night for residential uses). Grid information (e.g., OpenADR, market pricing, demand projections, and generation asset type) may be used to determine the best time to charge the vehicles connected to the electric vehicle charging optimization system and prioritize charging according to consumer needs and habits. This helps keep wholesale electricity costs low and demand changes low by smoothing out the demand curve. This is all done while providing that users have the charge needed when the charge is needed (e.g., in the morning when leaving for work), and the users remain in control. For example, the users may opt out of the schedule optimization for a night or more.

The electric vehicle charging optimization system provides a number of advantages compared to the prior art. For example, the electric vehicle charging optimization system of one or more of the present embodiments and, more specifically, the adapter and the charge calculator will work with any number of EVSEs and electric vehicles, respectively. In other words, the adapter and the charge calculator are brand agnostic. Additionally, being plug-and-play allows consumers to keep existing equipment and/or vehicles without having to pay for expensive upgrades or replacements. Prior art systems may require an upgrade to a new EVSE with WIFI capability.

As another example of an advantage, the electric vehicle charging optimization system of one or more of the present embodiments knows the SOCs of the electric vehicles, which creates a fully informed system for the optimization of the overall charging schedule. The electric vehicle charging optimization system is a complete system using information from both the EVSEs and the electric vehicle to make the most informed decisions. Users may feel a level of control over charging habits, which may incentivize participation.

As yet another example of an advantage, the electric vehicle charging optimization system of one or more of the present embodiments helps maximize the efficiency of current infrastructure in order to reduce the need for costly upgrades. This reduces the need to run more peaker plants during peak demand hours or idle peaker plants for anticipated increases in demand. By smoothing out the demand curve, thermal generating assets may save startup, idle, and shutdown fuel costs, which would save on carbon-based fuels. The electric vehicle charging optimization system further allows for the increased use of renewable energy by prioritizing charging to occur during peak renewable energy production.

FIG. 1 shows one embodiment of an electric vehicle charging optimization system 100. The electric vehicle charging optimization system 100 includes one or more computing devices (e.g., one or more servers) representing a cloud 102, a user computing device 104 (e.g., a mobile device), an electric vehicle 106, in which a charge calculator is located, an adapter 108 at a charger for the electric vehicle 106, a utility/grid operation system 110, and a power plant 112. The electric vehicle charging optimization system 100 may include more, fewer, and/or different devices. For example, the electric vehicle charging optimization system 100 may not include the adapter 108, and the cloud 102 may communicate directly with the charger for the electric vehicle 106. As another example, the electric vehicle charging optimization system 100 does not include the charge calculator, and the mobile device 104 performs the acts described below for the charge calculator.

FIG. 1 shows one mobile device 104, one electric vehicle 106, and one adapter 108 for illustrative purposes. The electric vehicle charging optimization system 100 may include any number of user computing devices 104, electric vehicles 106, and adapters 108. For example, the electric vehicle charging optimization system 100 may include as many user computing device 104, electric vehicles 106, and corresponding charge calculators, and adapters 108 as the number of users that have opted into the optimization (e.g., by installing a charge calculator in the respective electric vehicle 106, installing an adapter 108 at a corresponding charger, and signing up for the optimization at the respective mobile device 104). In one embodiment, some users have an installed adapter 108 while other users do not (e.g., only have a charger).

The mobile device 104, the electric vehicle 106 (e.g., the charge calculator of the electric vehicle 106), the adapter 108, and the utility/grid operation system 110 are in communication (e.g., direct or indirect) with the cloud 102 via one or more networks. In one embodiment, at least some of the devices of the electric vehicle charging optimization system 100 are in direct communication with each other. For example, the smart charge calculator within the electric vehicle 106 and the smart adapter 108 are in direct communication with each other.

The mobile device 104, the charge calculator of the electric vehicle 106, the adapter 108, and/or the utility/grid operation system 110 may be in communication with the cloud 102 via a same or one or more different networks. The one or more networks may include any number of different types of wireless networks including, for example, WIFI, Bluetooth, Long-Term Evolution (LTE), 3G, 5G, other types of networks, or any combination thereof. The utility/grid operation system 110 is in communication with the power plant 112 and/or a grid distributing electricity generated by the power plant 112, and the power plant 112 powers the electric vehicle 106 via the adapter 108 and the corresponding charger. The charge calculator of the electric vehicle 106 estimates an SOC for the electric vehicle 106 and sends the estimated SOC to the cloud 102 for vehicle charging optimization. In one embodiment, the cloud estimates the SOC for the electric vehicle 106.

Figure 2:
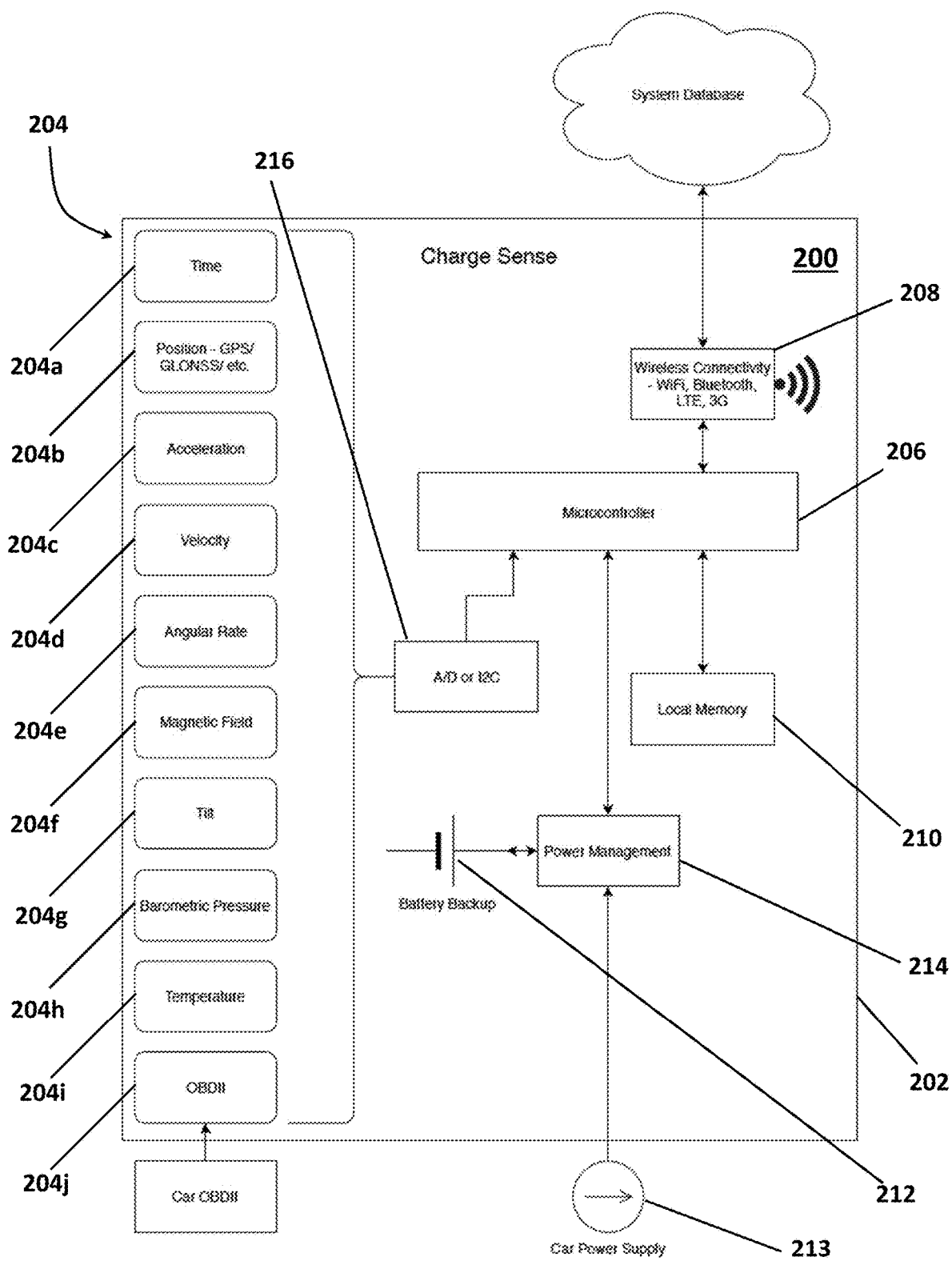
FIG. 2 shows one embodiment of a charge calculator.

FIG. 2 shows one example of a charge calculator 200. The charge calculator 200 includes a housing 202 that supports any number of components. The housing 202 of the charge calculator 200 may be any number of sizes and/or shapes. For example, the housing 202 of the charge calculator 200 may be cubic or rectangular in shape. The size of the housing 202 may be minimized, so that the charge calculator 200 does not take up too much space within, for example, the center console of the electric vehicle 106.

The charge calculator 200 is separate from the electric vehicle 106, for example, but is supportable within the electric vehicle 106. For example, the charge calculator 200 may be positionable within a center console of the electric vehicle 106. The charge calculator 200 may be positionable at other positions within the electric vehicle 106. For example, the charge calculator 200 is positionable at locations within the electric vehicle 106 that are accessible to power provided by the electric vehicle (e.g., a USB interface or a 12 Volt power source such as a cigarette lighter).

The components supported by the housing 202 may include, for example, one or more sensors 204, a processor 206, and a wireless communication interface 208. The charge calculator 200 may include more, fewer, and/or different components. For example, the charge calculator 200 may include a memory 210, a power supply 212, power management circuitry 214, and/or a bus 216 between the processor 206 and the one or more sensors 204. Other components may be provided. For example, the charge calculator 200 may include a display.

The one or more sensors 204 provide information related to the driving route (e.g., position, tilt), how the user is driving (e.g., velocity, acceleration), the environment in which the user is driving (e.g., atmospheric pressure), and/or additional information that may affect energy usage (e.g., temperature within the electric vehicle), such that SOC may be calculated for a particular trip.

The one or more sensors 204 may include any number of different types of sensors. For example, the one or more sensors 204 may include: a real-time clock (RTC) 204a configured to keep track of a current time; a position sensor such as a global positioning system (GPS) sensor, a global navigation satellite system (GNSS) sensor, or a global navigation satellite system (GLONASS) sensor 204b (e.g., a receiver with an antenna) configured to provide positioning, velocity, and timing information for the charge calculator 200 and thus the electric vehicle 106 in which the charge calculator 200 is positioned; an accelerometer 204c (e.g., a multi-field, piezoelectric sensor, a micro electro-mechanical system (MEMS) sensor) configured to provide acceleration information for the charge calculator 200 and thus the electric vehicle 106 in which the charge calculator 200 is positioned; a velocity sensor 204d (e.g., a multi-field, moving field or piezoelectric sensor) configured to provide velocity information for the charge calculator 200 and thus the electric vehicle 106 in which the charge calculator 200 is positioned; an angular rate sensor 204e such as, for example, a gyroscope configured to provide angular rate information for the charge calculator 200 and thus the electric vehicle 106 in which the charge calculator 200 is positioned; a magnetic field sensor 204f (e.g., a MEMS magnetic field sensor) configured to provide information about a magnetic field within the electric vehicle 106; a tilt sensor 204g (e.g., an inclinometer) configured to provide information about a tilt of the charge calculator 200 and thus the electric vehicle 106 in which the charge calculator 200 is positioned; an atmospheric pressure sensor 204h (e.g., a barometric air pressure (BAP) sensor configured to provide information about the atmospheric pressure of the environment in which the electric vehicle 106 is driving); a temperature sensor 204i configured to provide information about a temperature within the electric vehicle 106. The charge calculator 200 may include any number of different combinations of the sensors 204 and/or may include multiple sensors of any type of the sensors 204 (e.g., multiple gyroscopes 204e). The one or more sensors 204 may include additional types of sensors including, for example, a humidity sensor. In one embodiment, the charge calculator 200 also interfaces with on-board diagnostics (OBD) and receives OBD-II data, for example, at 204j.

The one or more sensors 204 communicate with the processor 206 via the bus 216. For example, the one or more sensors 204 transmit data to the processor 206 via an $I^2C$ bus 216. Other busses and/or interfaces may be provided. Data from the one or more sensors 204 may be further processed before being transmitted to the processor 206. For example, data from one or more of the sensors 204 may be converted by an analog-to-digital (A/D) converter before being transmitted to the processor 206. Other processing may be provided.

The processor 206 may include any number of different types of processors including, for example, one or more general processors, digital signal processors, application specific integrated circuits, field programmable gate arrays, digital circuits, analog circuits, combinations thereof, or other now known or later developed devices for analyzing and processing data. The processor 206 may implement a software program, such as code generated manually (e.g., programmed).

The memory 210 is in communication with the processor 206 and may store data from the one or more sensors 204. The memory 210 may store additional and/or different data. For example, the memory 210 may store data generated by the processor 206 or another processor based on information from the one or more sensors 204 (e.g., a charging schedule for the electric vehicle 106). The memory 210 may be a main memory, a static memory, or a dynamic memory. The memory 210 may be any number of different types of memory including, for example, computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media, or another type of memory. In one embodiment, the memory 210 includes a cache or random access memory for the processor 206.

Components of charge calculator 200 (e.g., the processor 206 and the one or more sensors 204) may be powered by the local power supply 212 and/or an external power supply 213 (e.g., via a cigarette lighter receptacle or a USB interface) via the power management circuitry 214. The local power supply 212 may be any number of different types of power supplies including, for example, a Lithium Ion battery. Other power supplies may be provided. The power management circuitry 214 may be, for example, a power management integrated circuit (PMIC) and may provide various functions including, for example, DC to DC conversion, battery charging, power-source selection, voltage scaling, power sequencing, and/or other functions.

Data generated by the processor 206 (e.g., estimated SOC) and/or data stored by the memory 210 may be transmitted to a device outside of the charge calculator 200 such as, for example, the cloud 102 via the wireless communication interface 208. The wireless communication interface 208 may include, for example, a Bluetooth antenna, a WIFI antenna, an LTE antenna, a 3G antenna, other antennas for other communication standards, or any combination thereof. In one embodiment, the charge calculator 200 includes a wired interface to allow for data transfer between, for example, the charge calculator 200 and the mobile device 104.

The components of the charge calculator 200 may communicate via wired and/or wireless connections. Alternatively or additionally, at least some of the components of the charge calculator 200 may be supported by and communicate with each other via one or more printed circuit boards (PCBs).

The charge calculator 200 estimates an SOC by calculating energy usage over time (e.g., over a car trip) and subtracting the calculated energy usage from the energy capacity of a battery of the electric vehicle 106. The energy usage over time is a mathematical function (e.g., an energy usage function) based on, for example, vehicle velocity, acceleration, rate of altitude change, drag due to an environment (e.g., external) and drag due to mechanical system efficiency (e.g., internal). The energy usage over time may also include another mathematic function (e.g., another energy usage function) based on, for example, temperature within the vehicle to estimate energy usage due to climate control being used within the vehicle.

The full battery capacity of a given electric vehicle is known based on user input (e.g., via the mobile device 104, stored by the memory 210) and specifications by a manufacturer of the electric vehicle 106 (e.g., stored by the memory 210 and received form the mobile device 104). As the user drives the electric vehicle 106, the processor 206 integrates energy usage over time based on the energy usage function, resulting in a calculated energy consumption. The processor 206 may subtract the calculated energy consumption from the battery capacity, resulting in an accurate estimate of the current SOC for the electric vehicle 106. The estimated SOC may then be sent to the cloud 102 and used to estimate the required energy to return the electric vehicle 106 to full range and schedule the electric vehicle 106 to charge within the confines of, for example, time-of-use (TOU) rates, load leveling goals, and/or green energy usage goals. In one embodiment, the cloud estimates the SOC.

Such a schedule specific for the electric vehicle 106, for example, may be generated by the cloud 102 and transmitted to the adapter 108 of a charging system and/or the charger of the charging system. In one embodiment, the schedule specific for the electric vehicle 106 is generated by the cloud 102 and transmitted directly to the charger of the charging system, such that the charger may control charging of the electric vehicle 106 based on the generated schedule.

Figure 3:
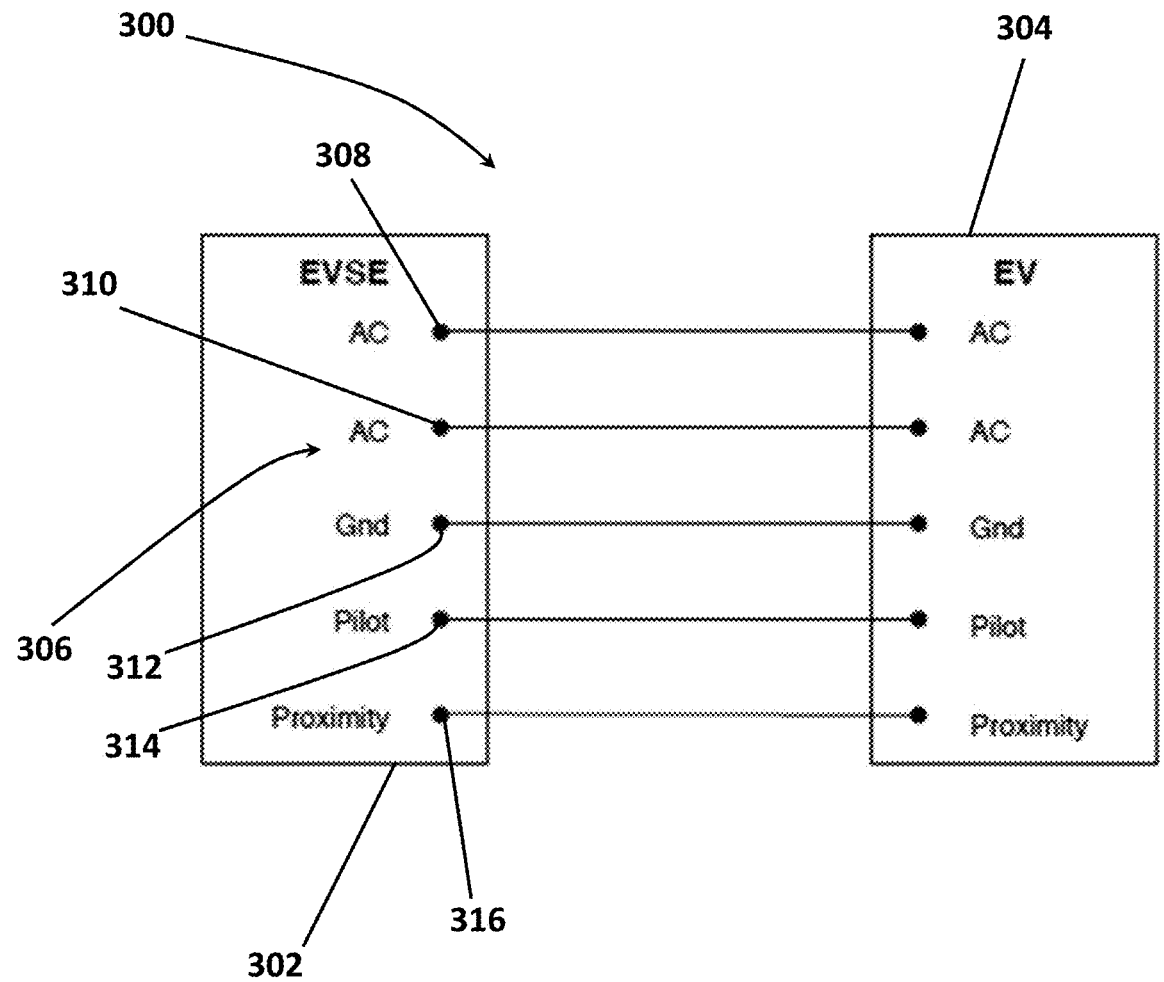
FIG. 3 shows a charging system.

FIG. 3 shows a charging system 300 of the prior art. The charging system 300 includes electric vehicle supply equipment (EVSE) 302 (e.g., a charger) and a corresponding connector 304 at an electric vehicle (e.g., the electric vehicle 106). A plug 306 of the charger 302 may be any number of different types of AC plugs, including, for example, an SAE J1772 connector (e.g., a "J plug", used in the United States), an IEC 62196-2 plug (e.g., used in Europe), a GB Part 2 plug (e.g., used in Great Britain and China), DC plugs, or combination AC/DC plugs.

The plug 306 of the charger 302 includes, for example, female connectors for single-phase alternating current (AC) charging of the electric vehicle 106. Alternatively or additionally, the plug 306 of the charger 302 includes female connectors for three-phase AC charging of the electric vehicle 106. In on example, the plug 306 of the charger includes one or more connectors for direct current (DC) charging.

As shown in the example of FIG. 3, the female connectors of the plug 306 include connectors for a number of signals including, for example, a first single-phase AC connector 308 (e.g., for Line 1), a second single-phase AC connector 310 (e.g., for Neutral), a full-current protective earthing system connector 312 (e.g., for Gnd, ground, or protective earth), a post-insertion signaling connector 314 (e.g., for Pilot or control pilot), and a pre-insertion signaling connector 316 (e.g., for proximity or proximity pilot). The electric vehicle 106, for example, includes corresponding male connectors (e.g., pins). In one embodiment, the plug 306 includes male connectors, and the electric vehicle 106 includes female connectors.

Charging via the plug 306 (e.g., the first single-phase AC connector 308 and/or the second single-phase AC connector 310) of the charger 302 may be delivered at different voltages, currents, and/or powers. For example, the electric vehicle 106 may be charged by the charger 302 at 120 V AC, a max current of 12 A or 16 A, and a power of 1.44 kW or 1.92 kW. Alternatively, the electric vehicle 106 may be charged by the charger 302 at 208 to 240 V AC, a max current of less than or equal to 80 A, and a power of up to 19.2 kW. Other combinations of charging voltage, current, and power may be provided.

The proximity pilot signal prevents movement of the electric vehicle 106, for example, while the electric vehicle 106 is connected to the charger 302 (e.g., the plug 306 of the charger 302) and identifies, for the electric vehicle 106, when a latch release button is activated at the charger 302. The control pilot signal signals a charging level between the charger 302 and the electric vehicle 106, and may identify presence of the electric vehicle 106, communicate a maximum allowable charging current, voltage, and/or power, and/or provide additional and/or different information between the charger 302 and the electric vehicle 106.

Charging may be controlled (e.g., prevented and/or interrupted) via any number of the signals. For example, charging may be controlled based on a charging schedule generated by the cloud 102 via the control pilot signal and/or the ground signal.

Figure 4:
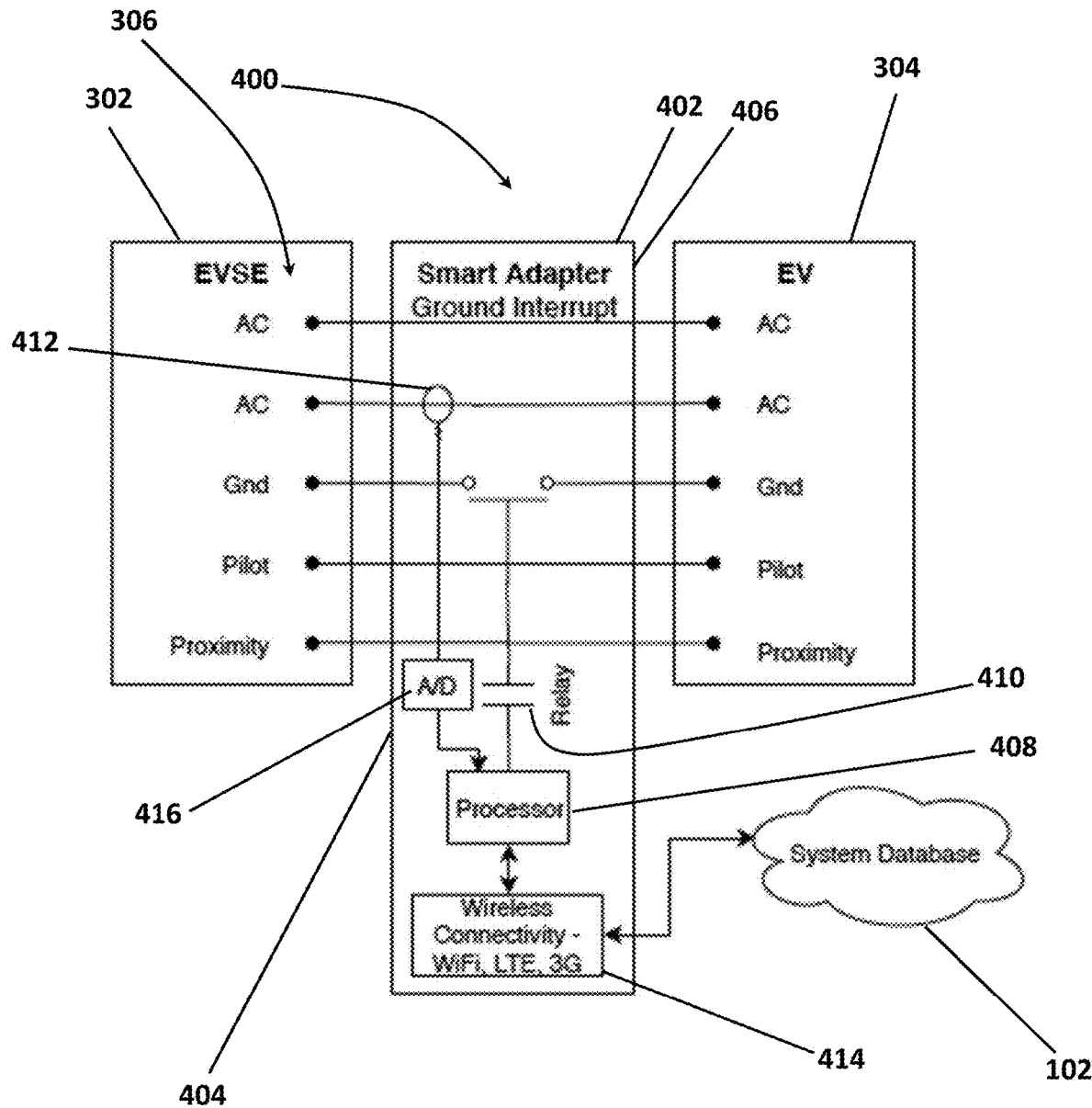
FIG. 4 shows a charging system including a first embodiment of an adapter.
Figure 5:
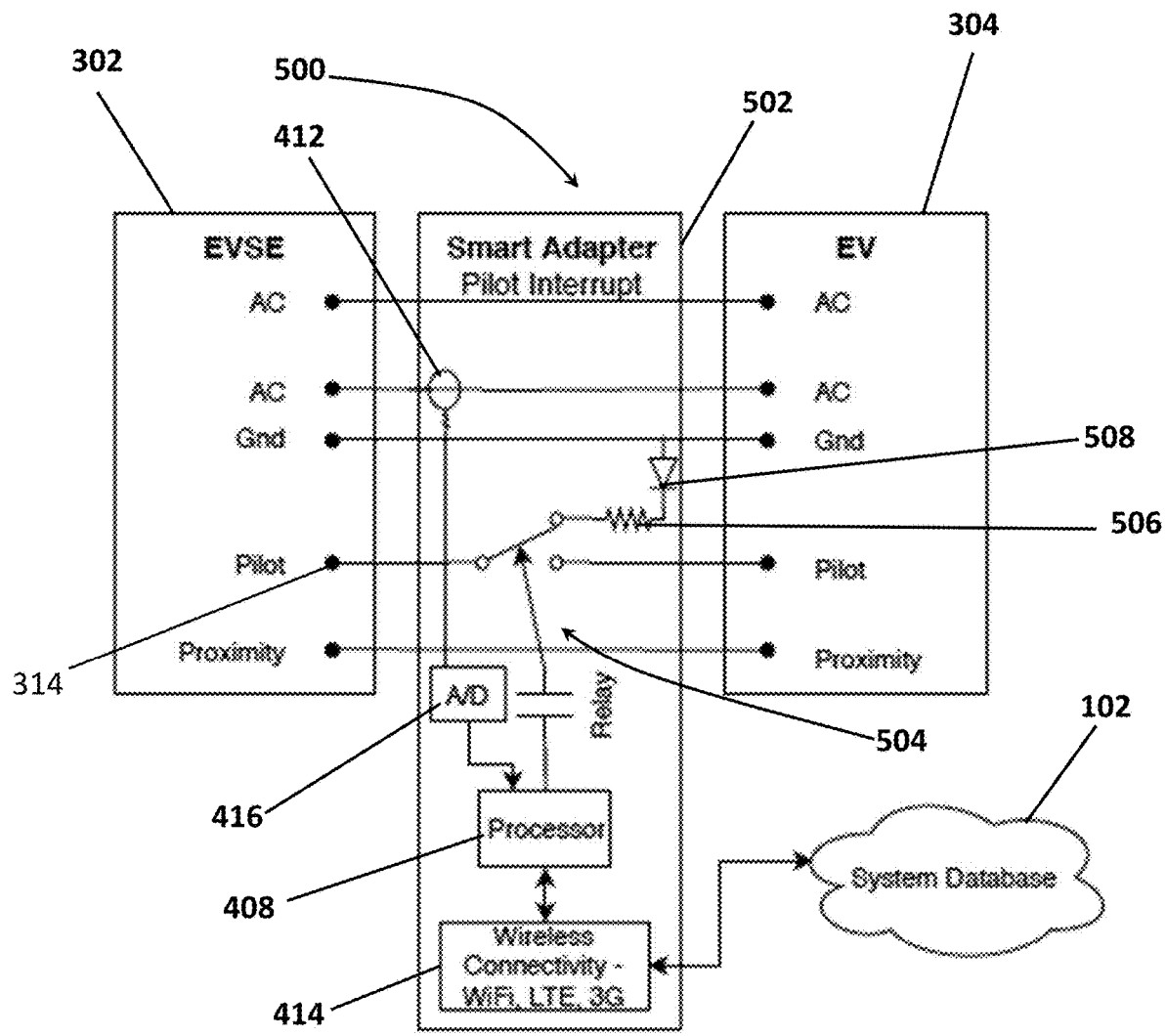
FIG. 5 shows a charging system including a second embodiment of an adapter.
Figure 6:
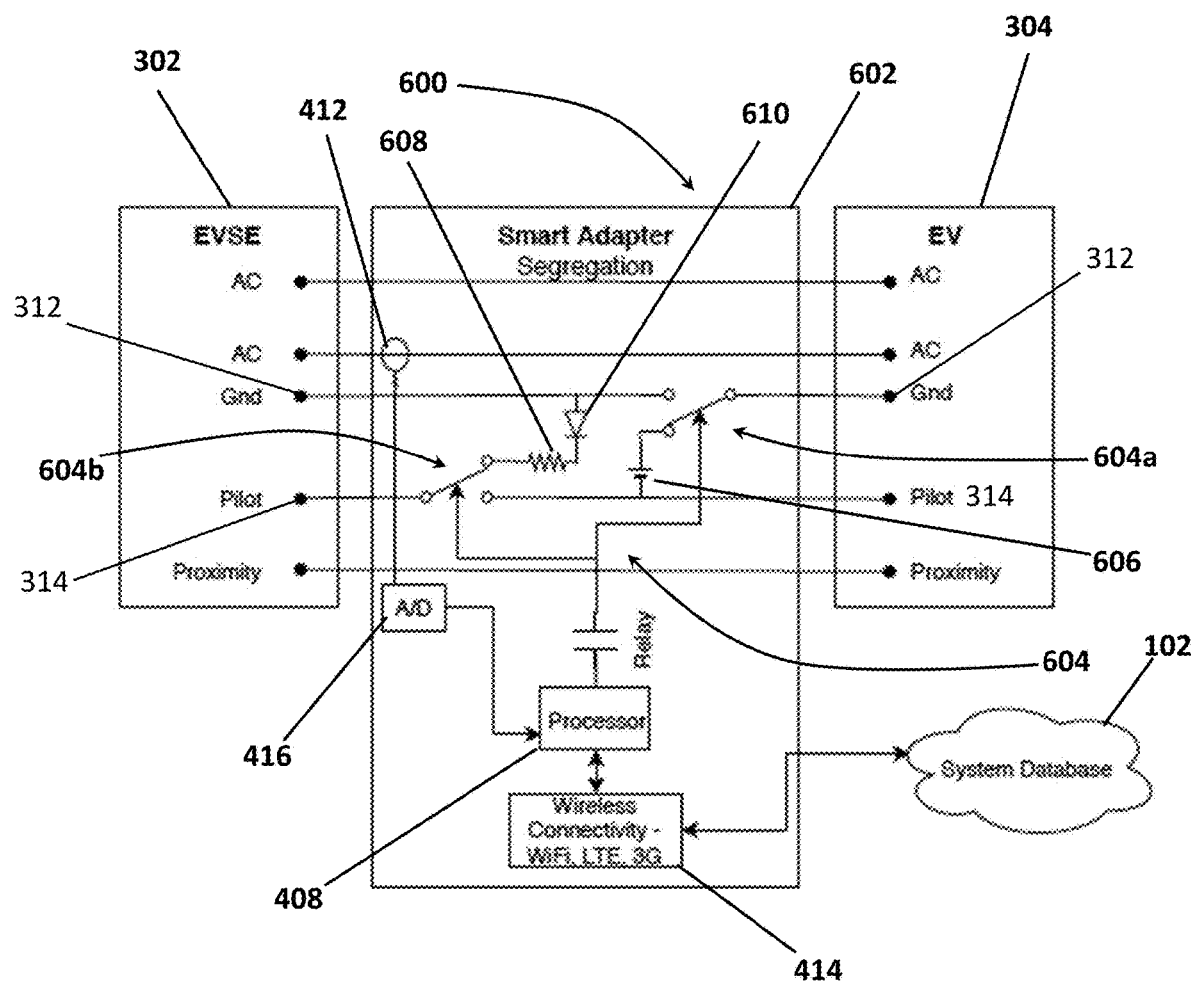
FIG. 6 shows a charging system including a third embodiment of an adapter.

FIGS. 4-6 show exemplary charging systems, respectively, including different embodiments of an adapter configured to control charging via one of the signals transmitted between the charger 302 and the electric vehicle 106 discussed above or another signal transmitted between the charger 302 and the electric vehicle 106. Referring to the first embodiment shown in FIG. 4, a charging system 400 includes an adapter 402 having a first side 404 and a second side 406. The first side 404 of the adapter 402 interfaces with the charger 302, and the second side 406 interfaces with the connector 304 of the electric vehicle 106. For example, the first side 404 of the adapter 402 includes male connectors that correspond to the female connectors of the plug 306, and the second side 406 of the adapter 402 includes female connectors that correspond to the male connectors at the electric vehicle 106. In other words, the connectors at the first side 404 of the adapter 402 match the connectors at the electric vehicle 106, and the connectors at the second side 406 of the adapter 402 match the connectors at the plug 306 of the charger 302. Different adapters 402 (e.g., with different connectors at the first side 404 and the second side 406) may be provided for different electric vehicle/charger combinations.

The adapter 402 includes a processor 408 in communication with a switch 410, one or more sensors 412, and a wireless communication interface 414. The components of the adapter 402 may be in communication with each other in any number of ways including, for example, via one or more PCBs and/or one or more wired connections.

The processor 408 may include any number of different types of processors including, for example, one or more general processors, digital signal processors, application specific integrated circuits, field programmable gate arrays, digital circuits, analog circuits, combinations thereof, or other now known or later developed devices for analyzing and processing data. The processor 408 may implement a software program, such as code generated manually (e.g., programmed).

The processor 408 may receive a charging schedule from the cloud 102, via the wireless communication interface 414. The wireless communication interface 414 may include, for example, a Bluetooth antenna, a WIFI antenna, an LTE antenna, a 3G antenna, a 5G antenna, other antennas for other communication standards, or any combination thereof.

The processor 408 controls the switch 410 based on the charging schedule received from the cloud 102. The switch 410 is, for example, a relay (e.g., a solid state relay or an electromechanical relay) configured to interrupt the ground signal between the charger 302 and the electric vehicle 106 based on instructions from the processor 408. For example, even though the charger 302 is physically connected to the electric vehicle 106 via the adapter 402, the processor 408 identifies, based on the received charging schedule, that the electric vehicle 106 is not to be charged during the particular time period. Accordingly, the processor 408 instructs the switch 410 to open, thus preventing charging current from flowing from the charger 302 to the electric vehicle 106. When the processor 408 identifies, based on the received charging schedule, that the electric vehicle 106 is to be charged during a particular time period, the processor 408 instructs the switch 410 to close, and charging current is allowed to flow from the charger 302 to the electric vehicle 106. In one embodiment, the processor 408 receives a command to open or close the switch 410 from the cloud 102, and the processor 408 instructs the switch 410 based on the received command.

The adapter 402 may include more, fewer, and/or different components. For example, the adapter 402 may include an analog-to-digital (A/D) converter 416 and/or a memory. For example, the one or more sensors 412 may include voltage, current, and/or electrical power sensors. In one embodiment, the one or more sensors 412 include an inductive sensor configured to measure voltage, current phase, and/or electrical power of the signal flowing through the second single-phase AC connector 310. The A/D converter 416 is configured to convert an input analog signal measured by the inductive sensor 412 to digital numbers representing, for example, values of the voltage and the current phase, respectively, measured by the inductive sensor 412. The converted input signal is transmitted to the processor 408 for further processing and/or transmission to the cloud 102 via the wireless communication interface 414. For example, the processor 408 may estimate an updated SOC of the electric car 106 during charging based on the converted input signal, and may transmit the estimated updated SOC of the electric car 106 to the cloud 102.

Referring to the second embodiment shown in FIG. 5, a charging system 500 includes an adapter 502. The adapter 502 includes a switch 504 that is different than the switch 410 shown in FIG. 4. Other than the switch 504, the adapter 502 includes components similar to the adapter 402 shown in FIG. 4 (e.g., the processor 408, the one or more sensors 412, and the wireless communication interface 414). Additional, fewer, and/or different components, however, may be included within the adapter 502.

The processor 408 controls the switch 504 based on the charging schedule received from the cloud 102. The switch 504 is, for example, a relay (e.g., a solid state relay or an electromechanical relay) configured to interrupt the control pilot signal between the charger 302 and the electric vehicle 106 based on instructions from the processor 408. When the switch 504 is in an open position, the post-insertion signaling connector 314 at the charger 302 is connected to protective earth via a resistor 506 and a diode 508, such that the control pilot signal is interrupted.

For example, even though the charger 302 is physically connected to the electric vehicle 106 via the adapter 502, the processor 408 identifies, based on the received charging schedule, that the electric vehicle 106 is not to be charged during the particular time period. Accordingly, the processor 408 instructs the switch 504 to open, thus preventing instructions for the charger 302 to charge the electric vehicle 106 included within the control pilot signal from reaching the charger 302. When the processor 408 identifies, based on the received charging schedule, that the electric vehicle 106 is to be charged during a particular time period, the processor 408 instructs the switch 504 to close, and instructions to charge the electric vehicle 106 reach the charger 302 via the control pilot signal. In one embodiment, the processor 408 receives a command to open or close the switch 504 from the cloud 102, and the processor 408 instructs the switch 504 based on the received command.

Referring to the third embodiment shown in FIG. 6, a charging system 600 includes an adapter 602. The adapter 602 includes one or more switches 604. Other than the one or more switches 604, the adapter 602 includes components similar to the adapter 402 shown in FIG. 4 (e.g., the processor 408, the one or more sensors 412, and the wireless communication interface 414). Additional, fewer, and/or different components, however, may be included within the adapter 602.

The one or more switches 604 include, for example, a first switch 604a and a second switch 604b. The first switch 604a and the second switch 604b may be controlled to provide complete segregation between the charger 302 and the electric vehicle 106. The processor 408 controls, for example, the first switch 604a and the second switch 604b based on the charging schedule received from the cloud 102. The first switch 604a and the second switch 604b are, for example, relays (e.g., solid state relays or electromechanical relays) configured to interrupt the ground signal between the charger 302 and the electric vehicle 106 and the control pilot signal between the charger 302 and the electric vehicle 106, respectively, based on instructions from the processor 408. In one embodiment, the first switch 604a and the second switch 604b form a single relay.

When the first switch 604a is in an open position, the ground signal is interrupted, and the full-current protective earthing system connector 312 of the electric vehicle 106 is connected to the post-insertion signaling connector 314 of the electric vehicle 106 via one or more components 606 (e.g., a power source). When the second switch 604b is in an open position, the post-insertion signaling connector 314 at the charger 302 is connected to protective earth via a resistor 608 and a diode 610 (e.g., as shown with the switch 504 of FIG. 5), such that the control pilot signal is interrupted. Charging current is prevented from flowing from the charger 302 to the electric vehicle 106 when the first switch 604a and/or the second switch 604b are in the open position.

Even though the charger 302 is physically connected to the electric vehicle 106 via the adapter 402, the processor 408 may identify, based on the received charging schedule, that the electric vehicle 106 is not to be charged during a particular time period and instruct the first switch 604a and the second switch 604b to move to the open position. When the processor 408 identifies, based on the received charging schedule, that the electric vehicle 106 is to be charged during a particular time period, the processor 408 instructs the first switch 604a and the second switch 604b to close, and charging current is allowed to flow from the charger 302 to the electric vehicle 106. In one embodiment, the processor 408 receives a command to open or close the first switch 604a and/or the second switch 604b from the cloud 102, and the processor 408 instructs the first switch 604a and/or the second switch 604b based on the received command.

In one embodiment, the charger 302 is directly connected to the electric vehicle 106. In other words, the charging system does not include the adapter 402 or another adapter. In such a case, the cloud 102 may transmit the charging schedule for the electric vehicle 106 directly to the charger 302, and the charger 302 may control charging of the electric vehicle 106 based on the charging schedule received from the cloud 102. Alternatively, the cloud 102 may generate and send instructions to the charger 302 to start charging and stop charging based on the charging schedule.

Referring to FIG. 1, for optimization of electric vehicle charging and/or other purposes, the cloud 102 sends data to and receives data from the mobile device 104, the charge calculator of the electric vehicle 106 (e.g., the charge calculator 200 of FIG. 2 or another charge calculator), the adapter 108 (e.g., the adapter 402 of FIG. 4, the adapter 502 of FIG. 5, the adapter 602 of FIG. 6, or another adapter), and the utility/grid operation system 110, respectively, via the one or more networks. The data received by the cloud 102 may be used for optimization of the charging schedule for the electric vehicle 106 (e.g., as part of an overall optimized charging schedule). The data sent by the cloud 102 may include a charging schedule for control of the charging of the electric vehicle 106 by the adapter 108 and/or may include feedback to the user related to, for example, energy consumption.

For example, as shown in FIG. 1, the mobile device 104 may send customer settings to the cloud 102. The customer settings may be input at the mobile device 104 or another computing device associated with the user and stored at the mobile device 104 or another computing device. Any number of customer settings including, for example, a minimum charge requirement, opt out days for the optimization, a make and a model of the electric vehicle 106, a type of charger connected to the adapter 108 at a home of the user, other information, or any combination thereof may be sent to the cloud 102.

The mobile device 104 may receive data related to energy consumption and/or other information from the cloud 102. For example, the cloud 102 may calculate historical averages and determine energy consumption by the electric vehicle 106 during charging, and send the calculated historical averages and determined energy consumption to the mobile device 104 for display, storage, and/or further processing at the mobile device 104.

The electric vehicle 106 and/or the charge calculator located within the electric vehicle 106 may send any number of different types of data to the cloud 102. For example, the charge calculator located within the electric vehicle 106 may send an estimated SOC to the cloud 102 at a predetermined interval (e.g., once every thirty minutes, once an hour, once every two hours, when the charge calculator determines the electric vehicle 106 is at home). The charge calculator may send additional data to the cloud 102 including, for example, sensor data (e.g., location data), an estimated energy consumption for a particular time period (e.g., since the last charge), and/or other data. In one embodiment, the charge calculator sends data to the cloud 102 when called upon by the cloud 102.

The charge calculator located within the electric vehicle 106 and/or the electric vehicle may receive data related to energy consumption, data from other devices of the electric vehicle charging optimization system 100 (e.g., the mobile device 104), and/or other information from the cloud 102. For example, the charge calculator may receive the historical averages, customer settings (e.g., the minimum required charge and the make and model of the electric vehicle 106), and/or other data from the cloud 102.

The adapter 108 and/or the charger to which the adapter 108 is connected may send any number of different types of data to the cloud 102. For example, the adapter 108 may send data related to power consumption and/or data related to the charger to the cloud 102. For example, the adapter 108 may send EVSE power consumption (e.g., after a charging session), an EVSE power rating (e.g., when the charger is first used with the adapter), and/or other information to the cloud 102.

The adapter 108 and/or the charger to which the adapter 108 is connected may receive a charging schedule for charging the electric vehicle 106 (e.g., for a particular time period (overnight), resulting from the overall charging schedule optimization at the cloud 102) from the cloud. The adapter 108, for example, may receive additional data from the cloud 102 including, for example, data related to energy consumption and/or data from other devices of the electric vehicle charging optimization system 100 (e.g., the mobile device 104 and the charge calculator). For example, the adapter 108 may receive the historical averages, customer settings (e.g., the minimum required charge and the make and model of the electric vehicle 106), the estimated SOC, and/or other data from the cloud 102. In one embodiment, the adapter 108 receives the customer settings, for example, directly from the mobile device 104 and receives the estimated SOC, for example, directly from the charge calculator.

The utility/grid operation system 110 also exchanges data with the cloud 102. For example, the utility/grid operation system 110 sends time-of-use rates data, demand response requests, electricity market information (e.g., California Independent System Operator (CAISO) market information), and/or other information to the cloud 102. The utility/grid operation system 110 receives any number of different types of data from the cloud 102 including, for example, data related to energy consumption. For example, the cloud 102 forwards the EVSE power consumption data received from the smart adapter 108 to the utility/grid operation system 110. The utility/grid operation system 110 may receive additional data from the cloud 102.

Figure 7:
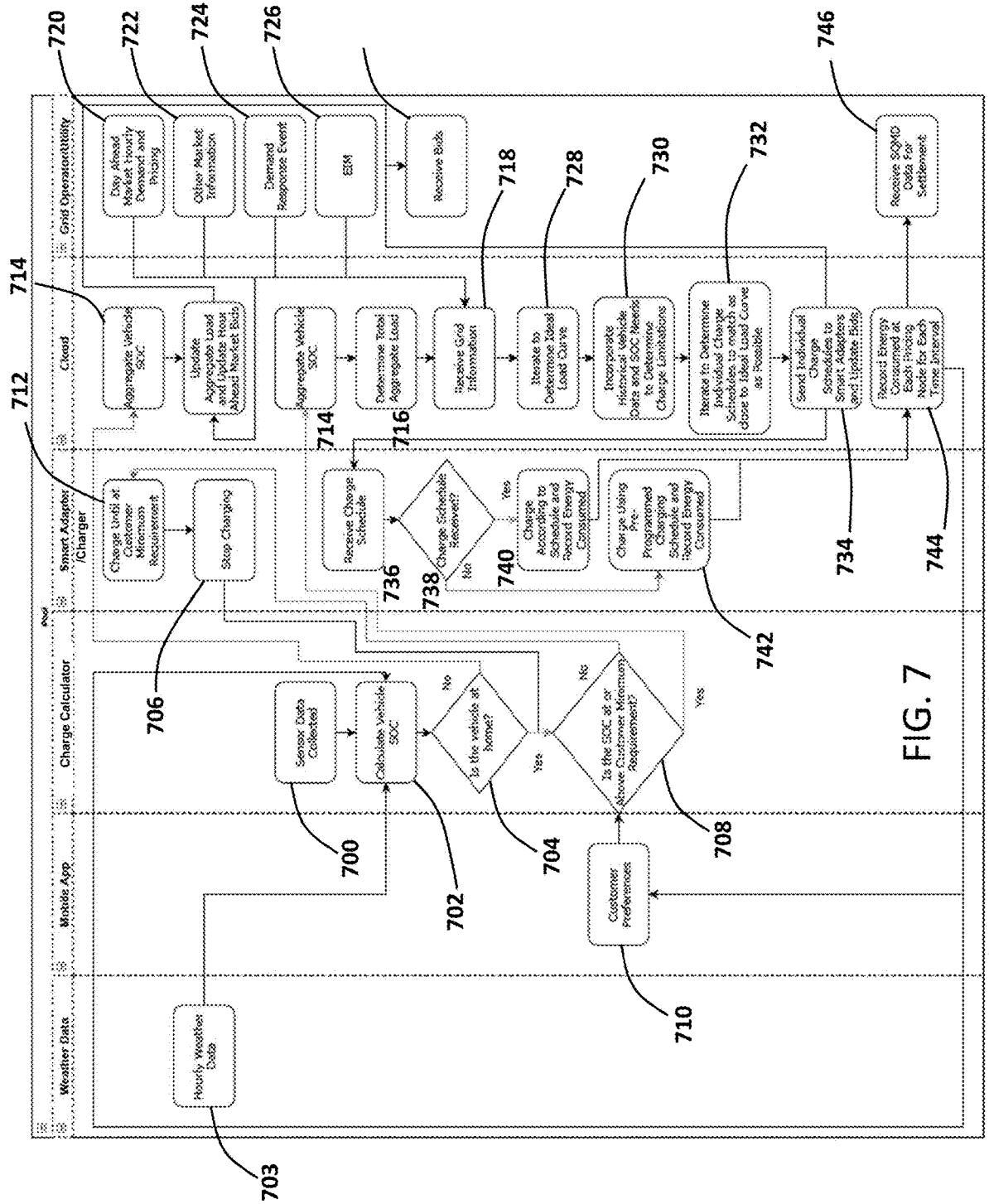
FIG. 7 shows a flowchart of one embodiment of a method for electric vehicle charging optimization.

FIG. 7 shows a flowchart of one embodiment of a method for electric vehicle charging optimization. The method may be performed using the system shown in FIG. 1 and/or the devices shown in one or more of FIGS. 2 and 4-8, or another system. The flowchart of FIG. 7 illustrates the method for a single electric vehicle. The method, however, may be implemented for a plurality of electric vehicles, and corresponding charge calculators and adapters, in parallel. The method is implemented in the order shown, but other orders may be used. Additional, different, or fewer acts may be provided.

In act 700, a processor of a charge calculator (e.g., the charge calculator 200 shown in FIG. 2) identifies data from one or more sensors of the charge calculator and/or an electric vehicle in which the charge calculator is located. For example, the one or more sensors send corresponding data to the processor at a predetermined time interval and/or the processor identifies data from the one or more sensors stored at a memory in communication with the processor.

The one or more sensors may include any number of different types of sensors including, for example, one or more GPS sensors, velocity sensors, acceleration sensors (e.g., accelerometers), gyroscopes, temperature sensors, barometer sensors, angular rate sensors, magnetic fields sensors, and/or other types of sensors. A GPS sensor may provide data related to velocity and/or position of the electric vehicle. A velocity sensor may provide data related to velocity of the electric vehicle. An acceleration sensor may provide data related to acceleration of the electric vehicle. A gyroscope may provide data related to an angle at which the electric vehicle is driving and/or an angular rate at which the electric vehicle is moving. A temperature sensor may provide data related to a temperature inside the electric vehicle, which may be used to identify whether climate control is running within the electric vehicle. A barometer sensor may provide data related to an atmospheric pressure of the environment in which the electric vehicle is driving. A magnetic field sensor may provide data related to a magnetic field strength within the electric vehicle.

The processor of the charge calculator may identify more, less, and/or different data from the one or more sensors and/or the electric vehicle. For example, the processor may identify data related to power from the electric vehicle (e.g., an on-board electric power source such as, for example, an on-board battery and/or an internal combustion engine). Other data may be identified.

In act 702, the processor calculates an SOC of the electric vehicle. The processor calculates the SOC of the electric vehicle based on the data identified in act 700. For example, four forces are calculated: a force of gravity $F(g)$; a force of inertia $F(i)$; a force of air resistance $F(a)$; and a rolling resistance $F(r)$. $F(g)$ is calculated using mass and angle of inclination. $F(i)$ is calculated using velocity, acceleration, time, and other inputs about the vehicle such as mass, gear ratio, motor specifics, tire information, etc. (e.g., may be input by a user at an application running on a mobile device or may be identified by the processor via the Internet). $F(a)$ is calculated using atmospheric conditions obtained through sources via the Internet, and using time and GPS coordinates provided by the one or more sensors, as well as velocity and heading. $F(r)$ is calculated using information about the wheels and tires of the vehicle (e.g., may be input by a user at an application running on a mobile device or may be identified by the processor via the Internet), as well as velocity and atmospheric conditions. The four forces are summed to calculate a total force $F(x)$. If $F(x)$ is positive, the vehicle does work to propel the vehicle forward. If $F(x)$ is negative, the vehicle is braking. If $F(x)$ is positive, speed and angular velocity of the motor are used to determine an efficiency factor. The efficiency factor is used to determine a total energy. Propulsion Energy is calculated by multiplying $F(x)$ by a distance traveled by the efficiency factor. If F(x) is negative, regenerative braking is calculated using an upper limit of deceleration for which the vehicle may no longer use regenerative braking to slow the car and uses friction brakes to slow the vehicle. A ratio is taken of this limit and actual deceleration multiplied by F(x). The ratio is then multiplied by the distance and a regenerative efficiency factor to calculate a regenerated energy. The calculated propulsion energy and the calculated regenerated energy are then added to an auxiliary energy (e.g., energy used by all other systems of the vehicle, which is estimated using public information), which excludes climate control. Climate control energy is calculated using public information about climate control systems. Using atmospheric conditions and internal temperature measurements, the processor may determine how much energy is being used for climate control. The sum of the calculated propulsion energy, the calculated regenerated energy, the auxiliary energy, and the calculated climate control energy provides an estimated total energy consumption at a given point in time. The total energy consumption may be estimated in other ways. For example, the climate control energy may not be considered as part of the estimated total energy consumption when an atmospheric temperature is below a first predetermined temperature (e.g., 75 degrees Fahrenheit) and/or above a second predetermined temperature (e.g., 60 degrees Fahrenheit).

In act 703, the processor may identify weather data for a location in which the electric vehicle is being used. For example, the processor may identify the weather data from an external source (e.g., the Internet) based on location data from the one or more sensors (e.g., a GPS sensor). The weather data may include data representing any number of current weather conditions including, for example, wind in the location in which the electric vehicle is being used. The weather data may be used to determine air resistance, and the determined air resistance may be used as part of the calculation of the SOC of the electric vehicle in act 702.

The processor may calculate the SOC of the electric vehicle at a predetermined interval. In one embodiment, the processor calculates the SOC of the electric vehicle every thirty minutes. In another embodiment, the processor calculates the SOC of the electric vehicle every hour. Other predetermined intervals may be used. In one embodiment, a cloud communicates with the processor and requests an updated SOC calculation for the electric vehicle when needed. In another embodiment, the charge calculator does not calculate the SOC, but provides the identified data from the one or more sensors of the charge calculator at a predetermined interval or based on a request from the cloud, and the cloud calculates the SOC of the electric vehicle.

In act 704, the processor determines whether the electric vehicle is located at a home associated with the electric vehicle. A location of the home associated with the electric vehicle may be identified by a user at a computing device (e.g., a mobile device running a mobile application), and the computing device may transmit the identified location of the home to the processor via a wireless communication interface of the charge calculator. The memory of the charge calculator may store the identified location of the home associated with the electric vehicle. Alternatively, the location of the home associated with the electric vehicle may be stored at the cloud and transmitted to the processor via the wireless communication interface of the charge calculator.

The processor determines whether the electric vehicle is located at the home associated with the electric vehicle in any number of ways. For example, the processor compares the identified location of the home associated with the electric vehicle with, for example, position data for the electric vehicle from a GPS sensor of the charge calculator. The processor determines the electric vehicle is located at the home associated with the electric vehicle if, for example, an address of the identified location matches an address identified within the position data from the GPS sensor. In another embodiment, the processor determines the electric vehicle is located at the home associated with the electric vehicle based on a communication from an adapter. For example, when the adapter, which is connected to a charger located at the home associated with the electric vehicle, or the charger is plugged into the electric vehicle, the adapter may identify the connection to the electric vehicle, generate a signal identifying the connection to the electric vehicle (e.g., a ready to charge signal), and transmit the generated signal to the cloud, for example. The cloud may transmit the ready to charge signal to the processor via the wireless communication interface of the charge calculator. In yet another embodiment, the processor determines the electric vehicle is located at the home associated with the electric vehicle via direct communications with one or more devices located at the home. For example, the processor may communicate with the adapter or the charger via WIFI and/or a Bluetooth connection.

The method moves to act 706 and act 708 if the processor determines the electric vehicle is at the home associated with the electric vehicle, and moves to act 714 if the processor determines the electric vehicle is not at the home associated with the electric vehicle. If the processor determines the electric vehicle is not at the home associated with the electric vehicle, the processor transmits the SOC calculated in act 702 to the cloud, and at least acts 700, 702, and 704 may be repeated at a predetermined interval (e.g., every thirty minutes) until the processor determines the electric vehicle is at the home associated with the electric vehicle.

If the processor determines the electric vehicle is at the home associated with the electric vehicle, the processor generates instructions (e.g., a command) for the adapter to interrupt charging of the electric vehicle by the charger at the home associated with the electric vehicle. The processor sends the generated command to the adapter via the wireless communication interface (e.g., via WIFI or the Bluetooth connection), and at act 706, the adapter or the charger interrupts the charging of the electric vehicle. The adapter may interrupt the charging of the electric vehicle in any number of ways including, for example, by interrupting the ground signal and/or the pilot control signal between the charger and the electric vehicle. The adapter may interrupt the charging of the electric vehicle in other ways.

In act 708, the processor determines whether SOC calculated in act 702 is at or above a minimum SOC requirement (e.g., a customer minimum requirement). In act 710, user preferences (e.g., customer preferences) are identified at, for example, the mobile application and transmitted to the charge calculator (e.g., via the cloud; stored by the memory of the charge calculator). User preferences may include user-defined data identifying the minimum SOC requirement for emergencies, for example, days and/or times the user opts out of the optimization, and/or other information. The other information may include, for example, a make and model of the electric vehicle and/or a battery capacity for the electric vehicle. The memory of the charge calculator may store predetermined values for the preferences (e.g., the minimum SOC requirement, 20% of full charge) until the user defines the preferences.

The user preferences may be transmitted to the charge calculator via the wireless communication interface (e.g., a 3G interface and/or an LTE interface) after the user has defined the user preferences within, for example, the mobile application running on the mobile device, and the memory of the charger calculator may store the user preferences. The user may update the user preferences within, for example, the mobile application running on the mobile device at any time, and the updated user preferences may be transmitted to the charge calculator and/or the cloud and stored by the memory of the charge calculator.

In act 708, the processor compares the SOC calculated in act 702 to the user-defined minimum SOC requirement. Based on the comparison, if the calculated SOC is less than the user-defined minimum SOC requirement, the method moves to act 712. If the calculated SOC is greater than or equal to the user-defined minimum SOC requirement, the processor transmits the SOC calculated in act 702 to the cloud, and the method moves to act 714. In act 712, the adapter allows the charger to charge the electric vehicle until the user-defined minimum SOC requirement is reached, and the processor transmits the SOC calculated in act 702 to the cloud. For example, if one or more switches of the adapter are moved to an open position based on the command sent to the adapter in act 706 to stop the charging by the charger, the adapter may move the one or more switches to a closed position to allow the charging until the user-defined minimum SOC requirement is reached. In one embodiment, the adapter is not provided, and the charger is connected directly to the electric vehicle. In such an embodiment, the cloud may instruct the charger to charge the electric vehicle until the user-defined minimum SOC requirement is reached.

In one embodiment, the adapter calculates a difference between the user-defined minimum SOC requirement and the calculated SOC and tracks the difference during the charging. The adapter may include at least one sensor configured to measure current, voltage, and/or electric power of the charging, and the adapter may estimate SOC of the electric vehicle during the charging based on the measured current, voltage, and/or power. The adapter may stop the charging once the estimated SOC is greater than or equal to the user-defined minimum SOC requirement. In one embodiment, the calculation and/or the control of the charging is performed by the cloud and/or the charger, and the adapter is not included in the charging system.

In act 714, the cloud aggregates electric vehicle SOC for electric vehicles subjected to the method (e.g., signed up for a service providing electric vehicle charging optimization; electric vehicles to be charged). In other words, for each of the electric vehicles, the respective charge calculator transmits the SOC calculated at act 702 for the respective electric vehicle to the cloud, and the cloud adds together each of the calculated SOCs, such that a total SOC (e.g., in kW-hr) is determined. The total SOC may be determined (e.g., aggregated) at a predetermined interval such as, for example, every thirty minutes or every hour. The cloud may aggregate electric vehicle SOC for a number of different groupings, and the method shown in FIG. 7 may be executed in parallel for the different groupings.

The aggregated electric vehicle SOC is used to understand what a total load and a total energy may be in order to optimize pricing. A total power consumption in kW may also be provided and used. For example, if 100 kWh is needed over a ten hour period, and a maximum capacity of infrastructure is 20 kW, then up to 20 kW may be charged over a 5 hour period. If, for example, an average vehicle consumption is 5 kW, then up to four vehicles may be charged at any given time. This provides that a line capacity is not exceeded, and charging will be completed ahead of schedule.

Also, with regard to the total energy, if, for example, pricing for hours one and two is $1/kWh, pricing for hours three to seven is $0.50/kWh, and pricing for hours eight to ten is $0.25/kWh, electric vehicle charging may be maximized during hours eight to ten. From the above, the cloud knows up to 20 kW/hour may be charged, so 60 kWh may be charged during hours eight to ten. The remaining 40 kWh may be scheduled to charge during hours five and six. This shifts all charging back by five hours, saving the buyer money. However, the cloud also needs to know which electric vehicles need what amount of energy. If electric vehicle A needs 20 kWh, the cloud will instruct the adapter or the charger associated with electric vehicle A to start charging at hour seven at the latest. If electric vehicle B only needs 5 kWh, the cloud may not schedule electric vehicle B to start charging until hour nine. This prevents an electric vehicle needing 20 kWh from starting charging at hour nine, for example, and having three hours of the charge occurring outside the $0.25/kWh rate. This will allow many things within the market to function differently. For example, variable rates that may save hundreds of dollars per year for consumers may be used at the retail level.

The electric vehicles may be assigned to the different groupings based on locations of the homes associated with the electric vehicles, respectively, and information related to how electrical power is delivered to customers. For example, the information related to how electrical power is delivered to customers may be geographical information defining boundaries served by particular power grids, substations, and/or nodes (e.g., related to one or more electrical busses of a power grid). In one embodiment, the electric vehicles to be charged are assigned to the different groupings based on neighborhoods in which the homes associated with the electric vehicles are respectively located. Other groupings may be provided. When a user signs up for the electric vehicle charging optimization provided by the method of FIG. 7, the user may be assigned to a particular grouping based on the location of the home or a charger location (e.g., located at an office or an apartment complex) associated with the respective electric vehicle and, for example, the defined boundaries.

In one embodiment, for each of the electric vehicles to be charged within a particular grouping, the respective charge calculator calculates an amount of energy to be delivered to the respective electric vehicle based on the SOC calculated in act 702 and the battery capacity for the respective electric vehicle (e.g., defined at act 710). For example, the respective charge calculator subtracts the calculated SOC from the battery capacity to calculate the amount of energy to be delivered to the respective electric vehicle. In one embodiment, instead of transmitting the calculated SOC to the cloud, the respective charge calculator updates the amount of energy to be delivered to the respective electric vehicle to the cloud at a predetermined interval (e.g., every thirty minutes) during use of the electric vehicle and sends a final calculated amount of energy to be delivered to the respective electric vehicle to the cloud when the processor of the respective charge calculator determines the vehicle is home in act 704. In other words, the cloud updates the aggregated energy to be provided for a particular grouping (e.g., electrical cars assigned to a particular substation) as the electrical cars assigned to the particular grouping are used through a day and parked for the night.

In act 716, the cloud determines a total aggregate load (e.g., for each of the groupings of electrical vehicles). For example, the cloud adds together power ratings for the chargers at the homes associated with the electric vehicles. In one embodiment, the cloud adds together power ratings for the chargers at the homes associated with the electric vehicles for each of the different groupings. The power ratings for the chargers may be user-defined in act 710, and data representing the user-defined power ratings is transmitted to the cloud. In another embodiment, for each of the electric vehicles to be charged, the respective adapter measures current, voltage, and/or electrical power during charging and determines a power rating for the respective charger based on the measured current, voltage, and/or electrical power. The respective adapter transmits data representing the determined power rating to the cloud. The power ratings for the chargers may be identified by the cloud in other ways.

In act 718, the cloud receives data related to grid information from, for example, a grid or utility operator (e.g., the utility/grid operation system 110). The data related to grid information may include data representing any number of different types of information including, for example, day ahead demand and pricing (e.g., bidding) and/or market hourly demand and pricing (see act 720), other market information (see act 722), demand response events (see act 724), and energy imbalance market (EIM) information (see act 726).

The day ahead market is based on optimal operating conditions, in which generators offer supply and load serving entities (LSE) bid demand. The market hourly demand and pricing is determined by supply and demand of electrical energy during different hours of a day. Other market demand and pricing may be provided to the cloud. For example, market fifteen minute demand and pricing, five minute demand and pricing, and/or real time demand and pricing (e.g., EIM information) may be provided to the cloud.

The other market information may include, for example, data related to the different markets for electricity (e.g., the different groupings and the boundaries for the different grouping), data related to who buys and sells electricity within the different markets, data related to renewable energy sources and destinations, and/or other information. The data related to demand response events may identify time periods during which prices for electricity are higher due to higher demand. Alternatively or additionally, the data related to demand response events may include explicit requests to reduce power consumption and/or data identifying price changes.

In act 728, the cloud determines an ideal load curve. The cloud determines, for example, an ideal overall load curve using all market data. This is, for example, a macro solution to a problem for an entire fleet of electric vehicles to be charged. Iterations, algorithms, machine learning, artificial intelligence, etc. may be used in determining the ideal load curve.

In act 730, the cloud incorporates historical electric vehicle data and SOC needs to determine charge limitations. Using the ideal load curve, a realistic load curve is determined using limitations created by the vehicles abilities, customer preferences, and power limitations. The realistic load curve may be determined using, for example, iterations, algorithms, machine learning, artificial intelligence, etc.

In act 732, the cloud determines charge schedules for the electric vehicles to be charged (e.g., for a particular grouping), such that a resultant load curve taking loads from the determined charge schedules into account matches the ideal load curve determined in act 728 as closely as possible. The determination of the charge schedules may be an optimization (e.g., an iteration) with the ideal load curve being a goal of the optimization, taking the historical vehicle data and SOC needs from act 730 into account.

Optimization may occur in a number of ways. As an example, there may be four electric vehicles in a predefined area (e.g., a geographic location, a building, a street, a neighborhood, a feeder, a substation, a distribution network, or another grouping). The SOC of electric vehicle A is determined to require 5 kWh of charge on a particular night. The SOC of vehicles B, C, and D are determined to require 5 kWh, 15 kWh, and 25 kWh of charging, respectively. In this example, all four electric vehicles have a charging capacity of 5 kW. An embodiment of the method of FIG. 7, for example, would then schedule electric vehicles A and D to begin charging at a same time. When electric vehicle A completes charging session A, electric vehicle B would begin charging session B, and electric vehicle D would continue charging session D. When electric vehicle B completes charging session B, electric vehicle C would begin charging session C, while electric vehicle D continues charging session D. Electric vehicles C and D would complete charging sessions C and D, respectively, at a same time.

This creates a scenario where all four electric vehicles are charged over a five hour period, but no more than two electric vehicles, or 10 kW of capacity, charge at the same time. The beginning charge time may be determined by market inputs (e.g., determining a lowest wholesale cost of electricity) and/or user inputs (e.g., when the electric vehicles are available to charge). Further customization may be provided. For example, if electric vehicle C needs to be available before electric vehicle A (e.g., based on user preferences and historical data), then electric vehicle C and electric vehicle A may swap charging times in the above example. Further, if different electric vehicles and/or chargers connected to the electric vehicles have different capacities (e.g., 2.5 kW), then two electric vehicles with this charging capacity may be charged at a same time to equal a total of 5 kW. Charging would take the same amount of time, and the same number of vehicles would be charged during this time. Other factors may be used to determine how these vehicles are charged such as demand response events, frequency regulation, availability of renewable generating assets, capacity, rate structures, and/or other information.

A charge schedule for an electric vehicle may identify time periods during which charging is to occur for the electric vehicle. Alternatively or additionally, the charge schedule for the electric vehicle may identify time periods during which charging is not to occur for the electric vehicle. At least some of the charge schedules may be the same, or each of the charge schedules may be different.

In act 734, the cloud sends the charge schedules determined in act 732 to the adapters connected to the electric vehicles to be charged, respectively. The cloud may conduct a single optimization per day (e.g., between 8:00 PM and midnight), and the cloud may send all of the charge schedules to the adapters at a same time. In one embodiment, the cloud continues to update the optimization and send corresponding updated charge schedules to the adapters as the electric vehicles to be charged continue to be used throughout the day. In such an embodiment, there may be a cut-off time at which charge schedules to be transmitted to the adapters or the chargers, respectively, are finalized.

In act 734, the cloud may also update bids to the grid or utility operator based on the charge schedules determined in act 732. The updated bids may allow the grid or utility operator to provide more accurate market hourly demand and pricing. The updated bids may also allow other entities in the market to bid accordingly.

In act 736, the adapter receives the charge schedule determined in act 732. In one embodiment, each of the adapters associated with the electric vehicles to be charged (e.g., for a particular grouping) receives a respective charge schedule. In another embodiment, a mixture of chargers and adapters associated with the electric vehicles to be charged receive the charge schedules, respectively. In yet another embodiment, only chargers receive the charges schedules, respectively, and the adapters are not used to control charging. In such an embodiment, the method moves to act 740, and the chargers control the charging of the electric vehicles, respectively.

In act 738, the adapter determines whether a charge schedule has been received. For example, at a particular time each evening (e.g., 11:00 PM), the adapter determines whether a charging schedule has been received. If a charging schedule has been received, the method moves to act 740. If a charging schedule has not been received, the method moves to act 742.

In act 740, the adapter facilitates charging of the electric vehicle by the charger at the home associated with the electric vehicle based on the received charging schedule. For example, each of the adapters connected to an electric vehicle to be charged executes the respective charge schedule determined in act 732 by, for example, modifying, manipulating, or intercepting the pilot control signal and/or by interrupting the ground signal between the electric vehicle and the charger connected to the respective adapter when charging is not to occur, and by allowing the ground signal and the pilot control signal to flow unaltered when charging is to occur. Charging may be stopped and started by the adapter in other ways. In one embodiment, the charger controls the charging.

When the adapter or the charger does not receive a charge schedule from the cloud due to, for example, network connectivity issues or due to the electric vehicle associated with the adapter still being in use when the charge schedules are generated in act 732, the adapter facilitates charging of the electric vehicle according to a predetermined charge schedule in act 742. The predetermined charge schedule may be based on a charge schedule determined for a different day or may be based on historical data related to on-average cheapest times for electricity. In both acts 740 and 742, regardless of the specific charge schedule followed, the adapter or the charger records energy consumed during the charging of the electric vehicle and sends the recorded energy consumed to the cloud. The adapter or the charger may record the energy consumed at a predetermined interval during the charging of the electric vehicle (e.g., every fifteen minutes) and send the recorded energy consumed to the cloud at the predetermined interval.

In act 744, the cloud receives the recorded energy consumed sent by the adapter or the charger (e.g., associated with a particular electric vehicle and home or location) and stores the recorded energy consumed. The cloud may receive recorded energy consumed from the adapters assigned to all of the electric vehicles to be charged, respectively. The cloud may aggregate the recorded energy consumed for each of the groupings (e.g., for all of the electric vehicles being charged by a particular node).

In act 746, energy consumption data may be transmitted to the grid or utility operator. For example, the cloud may transmit the aggregated recorded energy consumed for a particular node to the grid or utility operator. Other data may be transmitted to the grid or utility operator.

Using smart, managed charging by a third party may keep rates lower for ratepayers and prioritize electric vehicle charging to occur during peak renewable production as much as possible. Utility/grid operator information, SOC data from participating vehicles, and customer preferences are used to intelligently manage electric vehicle charging times across neighborhoods, districts, and cities to provide that no part of the grid is overloaded and customers are not stranded. This approach maximizes the use and efficiency of the current electrical grid and allows for smarter planning of any necessary future upgrades, potentially saving billions of dollars.

Multi-unit housing may be slow to install a sufficient number of chargers due to the cost of interconnection upgrade requirements to handle the increased load. The method of FIG. 7 and/or other similar methods of the present embodiments may allow more ports per circuit to be installed than currently allowed based on classic circuit loading. The need for costly interconnection upgrades may thus be reduced.

For example, multiple ports may be provided per charger, and the charger and/or adapters or chargers connected to the multiple ports may intelligently manage charging of different vehicles at different times so that existing interconnection infrastructure may be utilized as efficiently as possible. In one example, tens of electric vehicles may be charged throughout a night, when most residential charging occurs, with only a few (e.g., three or four) being charged at a time. This not only saves on total installation costs by reducing the number of chargers needed and reducing interconnection upgrades, but also reduces the cost of charging to consumers by avoiding high demand prices.

In order for the method of FIG. 7, for example, to operate properly, which vehicle is connected to which port on a charger is to be known. In one embodiment, radio frequency identification (RFID) chips may be placed inside the electric vehicles (e.g., embedded in stickers located within charge compartment next to a charge port), respectively. The port from the charger may include a reader configured to identify the electric vehicle based on the RFID chip. Identification of the vehicle/charger connection may be provided in other ways. For example, assigned parking may alleviate these issues, and/or communications (e.g., Bluetooth communications) between the charge calculator and the charger may identify a plug to which a particular electric vehicle is connected.

Figure 8:
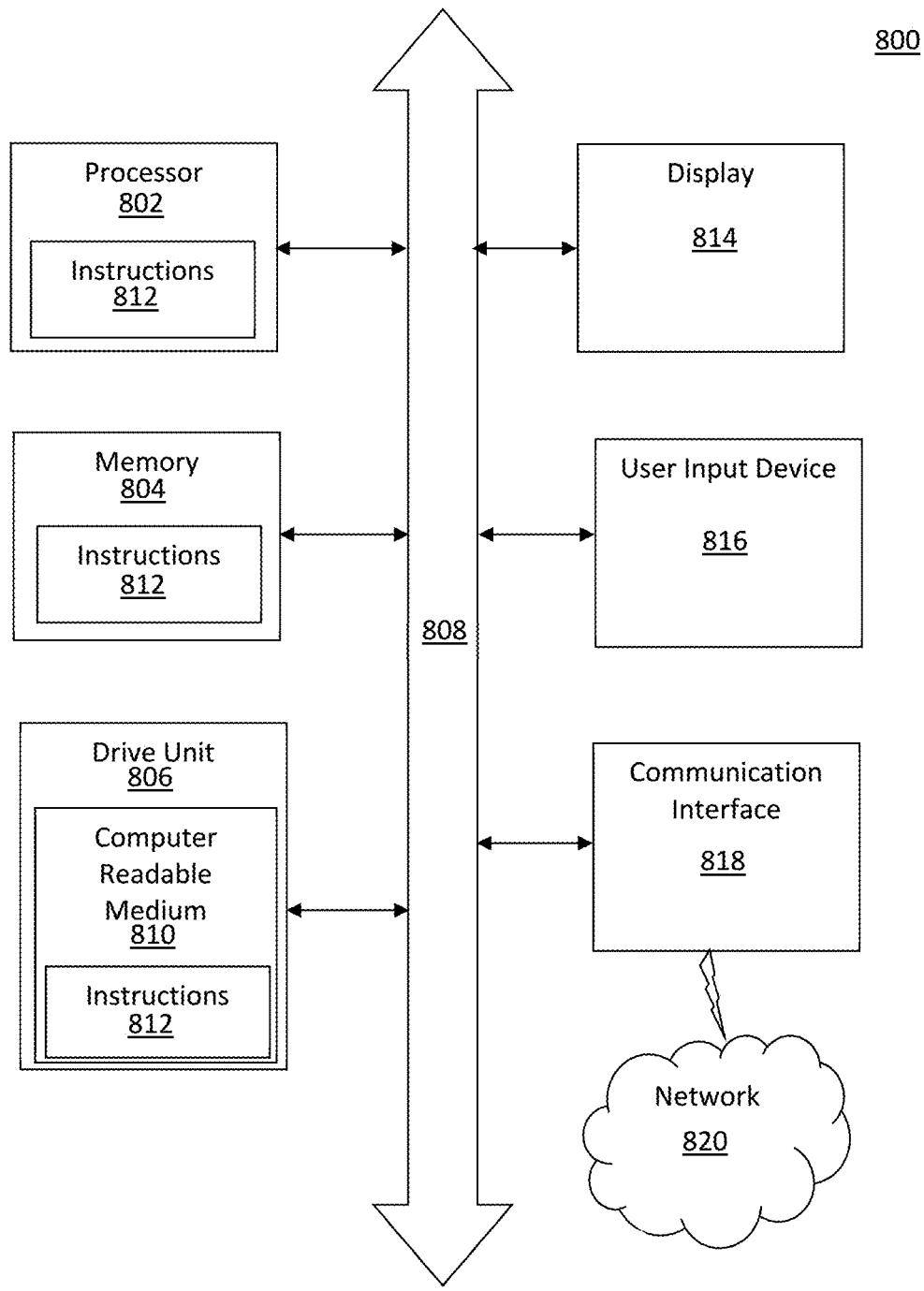
FIG. 8 shows one embodiment of a computer system for use with the system of FIG. 1.

FIG. 8 shows one embodiment of a computer system for use with the system of FIG. 1. FIG. 8 shows an illustrative embodiment of a general computer system 800. The computer system 800 may include a set of instructions that may be executed to cause the computer system 800 to perform any one or more of the methods or computer based functions disclosed herein. The computer system 800 may operate as a standalone device or may be connected (e.g., using a network) to other computer systems or peripheral devices. Any of the components discussed above may be a computer system 800 or a component in the computer system 800. For example, the server 102, the mobile device 104, and/or the charge calculator disposed within the electric vehicle 106 of the electric vehicle charging optimization system 100 of FIG. 1 may be a computer system 800 or a component in the computer system 800. Additional, fewer, and/or different components of, for example, the electric vehicle charging optimization system 100 of FIG. 1 may be a computer system 800 or a component in the computer system 800.

In a networked deployment, the computer system 800 may operate in the capacity of a server or as a client user computer in a client-server user network environment, or as a peer computer system in a peer-to-peer (or distributed) network environment. The computer system 800 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a personal trusted device, a web appliance, a network router, switch or bridge, a car, or any other machine capable of executing a set of instructions (sequential or otherwise) that specify actions to be taken by that machine. In one embodiment, the computer system 800 may be implemented using electronic devices that provide voice, video or data communication. Further, while a single computer system 800 is illustrated, the term "system" shall also be taken to include any collection of systems or sub-systems that individually or jointly execute a set, or multiple sets, of instructions to perform one or more computer functions.

As illustrated in FIG. 8, the computer system 800 may include a processor 802 such as, for example, a central processing unit (CPU), a graphics-processing unit (GPU), or both. The processor 802 may be a component in a variety of systems. For example, the processor 802 may be part of a standard personal computer or a workstation. The processor 802 may be one or more general processors, digital signal processors, application specific integrated circuits, field programmable gate arrays, servers, networks, digital circuits, analog circuits, combinations thereof, or other now known or later developed devices for analyzing and processing data. The processor 802 may implement a software program, such as code generated manually (i.e., programmed).

The computer system 800 may include a memory 804 that may communicate via a bus 808. The memory 804 may be a main memory, a static memory, or a dynamic memory. The memory 804 may include but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 804 includes a cache or random access memory for the processor 802. In alternative embodiments, the memory 804 is separate from the processor 802, such as a cache memory of a processor, the system memory, or other memory. The memory 804 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 804 is operable to store instructions executable by the processor 802. The functions, acts or tasks illustrated in the figures or described herein may be performed by the programmed processor 802 executing the instructions stored in the memory 804. The functions, acts or tasks are independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing and the like.

As shown, the computer system 800 may further include a display unit 814, such as a liquid crystal display (LCD), an organic light emitting diode (OLED), a flat panel display, a solid state display, a cathode ray tube (CRT), a projector, a printer or other now known or later developed display device for outputting determined information. The display 814 may act as an interface for the user to see the functioning of the processor 802, or specifically as an interface with the software stored in the memory 804 or in a disk or optical drive unit 806 (e.g., a disk drive unit).

Additionally, the computer system 800 may include an input device 816 configured to allow a user to interact with any of the components of system 800. The input device 816 may be a number pad, a keyboard, or a cursor control device, such as a mouse, or a joystick, touch screen display, remote control or any other device operative to interact with the system 800. In other embodiments, the input device 816 includes a credit card reader, an RFID reader, and/or other devices.

In one embodiment, as depicted in FIG. 8, the computer system 800 may also include the disk or optical drive unit 806. The disk drive unit 806 may include a computer-readable medium 810, in which one or more sets of instructions 812 (e.g., software) may be embedded. Further, the instructions 812 may embody one or more of the methods or logic as described herein. In one embodiment, the instructions 812 may reside completely, or at least partially, within the memory 804 and/or within the processor 802 during execution by the computer system 800. The memory 804 and the processor 802 also may include computer-readable media as discussed above.

The present disclosure contemplates a computer-readable medium that includes instructions 812 or receives and executes instructions 812 responsive to a propagated signal, so that a device connected to a network 820 may communicate voice, video, audio, images or any other data over the network 820. Further, the instructions 812 may be transmitted or received over the network 820 via a communication port 818. The communication port 818 may be a part of the processor 802 or may be a separate component. The communication port 818 may be created in software or may be a physical connection in hardware. The communication port 818 is configured to connect with the network 820 or another network, external media, the display 814, any other components in system 800, or combinations thereof. The connection with the network 820 may be a physical connection, such as a wired Ethernet connection or may be established wirelessly as discussed below. Likewise, the additional connections with other components of the system 800 may be physical connections or may be established wirelessly.

The network 820 may include wired networks, wireless networks, or combinations thereof, and may be representative of the network 106. The wireless network may be a cellular telephone network, an 802.11, 802.16, 802.20, or WiMax network. Further, the network 820 may be a public network, such as the Internet, a private network, such as an intranet, or combinations thereof, and may utilize a variety of networking protocols now available or later developed including, but not limited to TCP/IP based networking protocols.

While the computer-readable medium is shown to be a single medium, the term "computer-readable medium" includes a single medium or multiple media (e.g., a centralized or distributed database and/or associated caches and servers that store one or more sets of instructions). The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random access memory or other volatile re-writable memory. Additionally, the computer-readable medium may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In one embodiment, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limiting embodiment, implementations may include distributed processing, component/object distributed processing, and parallel processing. Alternatively, virtual computer system processing may be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

In connection with any one of the aforementioned embodiments, the systems, devices, or methods may alternatively or additionally include any combination of one or more of the previous embodiments.

The foregoing description is given for clearness of understanding only, and no unnecessary limitations should be understood therefrom, as modifications within the scope of the claims may be apparent to those having ordinary skill in the art.

The invention claimed is:

1. A system for determining a state-of-charge (SOC) of an electric vehicle, the system comprising:
a housing that is separate from but supportable within the electric vehicle;
one or more sensors supported by the housing, the one or more sensors being configured to determine one or more values related to the electric vehicle, respectively, each value of the one or more values representing a state of the electric vehicle or a state of an environment in which the electric vehicle is located;
a processor in communication with the one or more sensors, wherein the processor is configured to estimate an SOC of the electric vehicle based on the one or more determined values related to the electric vehicle; and
a wireless communication interface supported by the housing and in communication with the processor, the wireless communication interface being configured to transmit data representative of the estimated SOC of the electric vehicle, data representative of the one or more values related to the electric vehicle, or the data representative of the estimated SOC of the electric vehicle and the data representative of the one or more values related to the electric vehicle to the processor or to another processor, the other processor being remote from the electric vehicle.

2. The system of claim 1, wherein the one or more sensors are configured to determine the one or more values related to the electric vehicle at a plurality of time points.

3. The system of claim 2, wherein the estimation of the SOC of the electric vehicle comprises:
estimation of energy usage over time of the electric vehicle based on the one or more values related to the electric vehicle at the plurality of times;
identification of an initial SOC; and
subtraction of the estimated energy usage over time of the electric vehicle from the identified initial SOC.

4. The system of claim 3, further comprising a memory in communication with the processor, the memory being configured to store the one or more determined values related to the electric vehicle at the plurality of time points.

5. The system of claim 1, wherein the processor is supported by the housing, and
wherein the wireless communication interface is configured to transmit the data representative of the estimated SOC of the electric vehicle, the data representative of the one or more values related to the electric vehicle, or the data representative of the estimated SOC of the electric vehicle and the data representative of the one or more values related to the electric vehicle to the other processor.

6. The system of claim 3, wherein the data representative of the estimated SOC includes data representative of the estimated energy usage.

7. The system of claim 1, wherein the one or more sensors comprise:
one or more gyroscopes configured to determine a tilt of the electric vehicle, an angular rate of the electric vehicle, or the tilt and the angular rate of the electric vehicle;
one or more temperature sensors configured to determine a temperature of the environment, a temperature within the electric vehicle, or the temperature of the environment and the temperature within the electric vehicle, respectively;
one or more barometric pressure sensors configured to determine an atmospheric pressure of the environment;
one or more accelerometers configured to determine acceleration of the electric vehicle;

one or more global navigation satellite system (GNSS) sensors configured to determine a velocity of the electric vehicle;

one or more atmospheric pressure sensors configured to determine an atmospheric pressure of the environment; or any combination thereof.

8. The system of claim 7, wherein the one or more sensors comprise a temperature sensor configured to determine the temperature within the electric vehicle, and
wherein the estimation of the SOC of the electric vehicle comprises estimation of energy usage over time of a climate control system within the electric vehicle based on the determined temperature within the electric vehicle.

9. The system of claim 1, wherein the wireless communication interface comprises a WIFI communication interface, a Bluetooth communication interface, a Long-Term Evolution (LTE) communication interface, a 3G communication interface, or any combination thereof.

10. The system of claim 1, further comprising a power supply supported by the housing, the power supply being configured to power the one or more sensors and the processor.

11. The system of claim 1, further comprising a power interface supported by the housing and in communication with the one or more sensors and the processor, the one or more sensors and the processor being powerable by a power source of the electric car and external to the housing via the power interface.

12. The system of claim 1, wherein the processor is further configured to identify whether the electric car is connected to a particular charger based on data from the one or more sensors received by the processor, data received by the processor via the wireless communication interface, or based on a combination thereof.

13. The system of claim 1, wherein the processor is further configured to:
compare the estimated SOC of the electric vehicle to a predetermined minimum charge;
determine whether the estimated SOC is greater than or less than the predetermined minimum charge based on the comparison; and
instruct a charger to charge the electric vehicle or instruct an adapter connected to the charger and the electric vehicle to allow the electric vehicle to be charged when the estimated SOC is less than the predetermined minimum charge, the adapter being operable to block charging of the electric car.

14. The system of claim 13, wherein the processor is further configured to transmit the data representing the estimated SOC of the electric vehicle or the other data that is based on the estimated SOC of the electric vehicle to the server when the estimated SOC is greater than the predetermined minimum charge.

15. The system of claim 13, wherein the wireless communication interface is further configured to receive the predetermined minimum charge from a mobile device in communication with the system.

16. A method of determining a state-of-charge (SOC) of an electric vehicle, the method comprising:
determining, by a sensor of a device separate from but supported within the electric vehicle, a state of the electric vehicle or a state of an environment in which the electric vehicle is located;
estimating, by a first processor, an SOC of the electric vehicle based on the determined state of the electric vehicle or the determined state of the environment, the first processor being in communication with the sensor; and
sending, by a wireless communication interface of the device, data representative of the determined state of the electric vehicle or the state of the environment in which the electric vehicle is located, data representative of the estimated SOC, or the data representative of the determined state of the electric vehicle or the state of the environment in which the electric vehicle is located and the data representative of the estimated SOC to the first processor or a second processor, the second processor being remote from the electric vehicle.

17. The method of claim 16, further comprising estimating a required charge based on the estimated SOC,
wherein sending the data representative of the estimated SOC comprises transmitting data representative of the estimated required charge.

18. The method of claim 16, wherein determining the state of the electric vehicle or the state of the environment in which the electric vehicle is located comprises:
determining, by a gyroscope of the device, a tilt of the electric vehicle, an angular rate of the electric vehicle, or the tilt and the angular rate of the electric vehicle;
determining, by a temperature sensor of the device, a temperature of the environment or a temperature within the electric vehicle;
determining, by a barometric pressure sensor of the device, an atmospheric pressure of the environment or an altitude of the electric vehicle within the environment;
determining, by an accelerometer of the device, acceleration of the electric vehicle; or
determining, by a global positioning system (GPS) sensor of the device, a velocity of the electric vehicle.

19. The method of claim 18, wherein determining the state of the electric vehicle or the state of the environment in which the electric vehicle is located comprises determining, by the GPS sensor of the device, the velocity of the electric vehicle at a plurality of time points,
wherein estimating the SOC of the electric vehicle comprises estimating energy usage over time of the electric vehicle based on the determined velocity of the electric vehicle at the plurality of time points.

20. The method of claim 19, wherein the sending comprises sending the data representative of the estimated SOC to the second processor at a predetermined time interval or in response to a request from the second processor.

21. A device for optimizing charging of a plurality of electric vehicles, the device comprising:
a processor in communication with a plurality of charge calculators located in the plurality of electric vehicles, respectively, and in communication with one or more charger adapters associated with one or more electric vehicles of the plurality of electric vehicles, respectively, at least one charger connectable to at least one electric vehicle of the plurality of electric vehicles, or a combination thereof; and
a wireless communication interface in communication with the plurality of charge calculators via a network, the wireless communication interface being configured to receive data from the plurality of charge calculators representing state-of-charge (SOC) for the plurality of electric vehicles, respectively, data representing energy requirements for the plurality of electric vehicles, sensor data from the plurality of charge calculators, or any combination thereof;

a memory in communication with the processor, the memory being configured to store the data representing SOC, the data representing energy requirements, the sensor data, or any combination thereof;

wherein the processor is configured to identify power supply information, and determine charging schedules for the plurality of electric vehicles, respectively, based on the data representing SOC, the data representing energy requirements, the sensor data, or any combination thereof, and the identified power supply information, the determination of the charging schedules comprising optimization of when to charge each electric vehicle of the plurality of electric vehicles, such that a cost for charging the plurality of electric vehicles is minimized, and wherein the wireless communication interface is configured to send the determined charging schedules to the one or more charger adapters, the at least one charger, or the combination thereof, respectively.

* * * * *